US010594796B2

United States Patent
Verma et al.

(10) Patent No.: US 10,594,796 B2
(45) Date of Patent: Mar. 17, 2020

(54) EXTENDING AN IOT CONTROL INTERFACE FROM AN IOT CONTROLLER TO A USER DEVICE AS PART OF A VIDEO MEDIA STREAM OF A WIRELESS MEDIA PRESENTATION SESSION

(71) Applicant: QUALCOMM Incorporated, San Diego, CA (US)

(72) Inventors: Lochan Verma, San Diego, CA (US); Vijayalakshmi Raveendran, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 315 days.

(21) Appl. No.: 15/235,807

(22) Filed: Aug. 12, 2016

(65) Prior Publication Data

US 2017/0230461 A1    Aug. 10, 2017

Related U.S. Application Data

(60) Provisional application No. 62/293,305, filed on Feb. 9, 2016.

(51) Int. Cl.
*G06F 13/00* (2006.01)
*H04L 29/08* (2006.01)
(Continued)

(52) U.S. Cl.
CPC .......... *H04L 67/125* (2013.01); *G06F 3/0482* (2013.01); *G06F 3/04847* (2013.01);
(Continued)

(58) Field of Classification Search
CPC .. G06F 3/0482; G06F 3/04817; G06F 3/0484; G06F 3/04847; G06F 13/00;
(Continued)

(56) References Cited

U.S. PATENT DOCUMENTS

2014/0241354 A1    8/2014 Shuman et al.
2015/0195365 A1    7/2015 Choi et al.
(Continued)

FOREIGN PATENT DOCUMENTS

WO    2015126208 A1    8/2015

OTHER PUBLICATIONS

FIBARO Home intelligence, "Advanced User's Guide" (8.VIII. 2012 ver. 1.02\beta){Home Center 2}; pp. 1-101 : Printed 2012.*
(Continued)

*Primary Examiner* — Robert B Harrell
(74) *Attorney, Agent, or Firm* — Muncy, Geissler, Olds & Lowe, P.C.

(57) ABSTRACT

In an embodiment, an Internet of Things (IoT) controller receives information from IoT devices over an IoT communications interface. The IoT controller establishes a wireless media presentation session with a user device with the IoT controller acting as a source and the user device acting as a sink. The IoT controller generates a displayable IoT control interface for the IoT devices and sends the displayable IoT control interface to a user device within a media stream of the wireless media presentation session. The user device displays the displayable IoT control interface and sends the IoT controller user input feedback over a user input feedback channel. The IoT controller determines whether to modify one or more settings associated with the at least one IoT device based upon the user input feedback.

30 Claims, 16 Drawing Sheets

(51) Int. Cl.

| | |
|---|---|
| *H04L 12/28* | (2006.01) |
| *H04W 76/10* | (2018.01) |
| *G06F 3/0482* | (2013.01) |
| *G06F 3/0484* | (2013.01) |
| *H04L 12/66* | (2006.01) |
| *H04L 29/06* | (2006.01) |
| *H04W 84/12* | (2009.01) |
| *H04W 88/16* | (2009.01) |

(52) U.S. Cl.
CPC .......... *H04L 12/2803* (2013.01); *H04L 12/66* (2013.01); *H04L 67/025* (2013.01); *H04L 67/10* (2013.01); *H04L 67/104* (2013.01); *H04L 67/12* (2013.01); *H04L 67/14* (2013.01); *H04L 67/141* (2013.01); *H04L 69/16* (2013.01); *H04W 76/10* (2018.02); *H04W 84/12* (2013.01); *H04W 88/16* (2013.01)

(58) Field of Classification Search
CPC ................ H04L 29/06; H04L 29/0809; H04L 29/06095; H04L 29/08072; H04L 29/08576; H04L 67/16; H04L 12/66; H04L 12/2803; H04L 29/08; H04L 67/10; H04L 67/12; H04L 67/14; H04L 67/025; H04L 67/104; H04L 67/125; H04L 67/141; H04L 69/16; H04W 76/02; H04W 76/10; H04W 84/12; H04W 88/16

USPC ........................................................ 709/227
See application file for complete search history.

(56) References Cited

U.S. PATENT DOCUMENTS

2015/0286388 A1  10/2015  Jeon et al.
2015/0347114 A1  12/2015  Yoon

OTHER PUBLICATIONS

Samsung: "Smart Home Intelligent Living," Retrieved on Aug. 10, 2016, pp. 1, URL: https://www.smartthings.com/howitworks.
Wi-Fi Alliance: "Best Practices Document for Wi-Fi certified Miracast Devices," version 1.0, 2014, pp. 1-10.
Wi-Fi Alliance: "Technical Note Wi-Fi Certified Miracast HDCP Interoperability Issue: HDCP 2.2 Protocol Descriptor," Version 1.0, Mar. 24, 2015, 3 pages.
WiFi Alliance: "Wi-Fi Display Technical Specification," Version 1.1, 2012, pp. 1-151.
International Search Report and Written Opinion—PCT/US2016/063280—ISA/EPO—dated Feb. 24, 2017.
Wi Fi Alliance: "Wi-Fi Certified Miracast (TM): Extending the Wi-Fi Experience to Seamless Video Display", Internet Citation, Sep. 19, 2012 (Sep. 19, 2012), pp. 1-18, XP002700078, Retrieved from the Internet: URL:https://www.wi-fi.org/sitestdefault/files/uploadsfwp_Miracast_Industry_29129919.pdff.

* cited by examiner

US 10,594,796 B2

EXTENDING AN IOT CONTROL INTERFACE FROM AN IOT CONTROLLER TO A USER DEVICE AS PART OF A VIDEO MEDIA STREAM OF A WIRELESS MEDIA PRESENTATION SESSION

CROSS-REFERENCE TO RELATED APPLICATIONS

The present application for patent claims the benefit of U.S. Provisional Application No. 62/293,305, entitled "EXTENDING AN IOT CONTROL INTERFACE FROM AN IOT CONTROLLER TO A USER DEVICE", filed Feb. 9, 2016, which is by the same inventors as the subject application, assigned to the assignee hereof and hereby expressly incorporated by reference herein in its entirety.

TECHNICAL FIELD

Embodiments relate to extending an Internet of Things (IoT) control interface from an IoT controller to a user device.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

As such, in the near future, increasing development in IoT technologies will lead to numerous IoT devices surrounding a user at home, in vehicles, at work, and many other locations. Due at least in part to the potentially large number of heterogeneous IoT devices and other physical objects that may be in use within a controlled IoT network, which may interact with one another and/or be used in many different ways, well-defined and reliable communication interfaces are generally needed to connect the various heterogeneous IoT devices such that the various heterogeneous IoT devices can be appropriately configured, managed, and communicate with one another to exchange information.

Various protocols exist for streaming media (e.g., video, audio, etc.) over local wireless networks (e.g., infrastructure Wireless Local Area Networks (WLANs), etc.). One example is Version R1 of Miracast (hereinafter, "Miracast-R1"), which defines a protocol by which a source device (hereinafter "Source", such as a UE such as a phone, laptop, etc.) can connect to an external display device (referred to as a sink device or "Sink") using a WiFi Direct connection. Miracast-R2 is a newer version of Miracast that is currently under development and which is considering support for multiple Sources connected to a single Sink (many-to-one) and a single Source connected to multiple Sinks (one-to-many).

SUMMARY

An embodiment is directed to a method of permitting, to one or more user devices, access to two or more Internet of Things (IoT) devices of an IoT network using an IoT controller, including receiving information from the two or more IoT devices over an IoT communications interface, establishing a wireless media presentation session with a user device with the IoT controller acting as a source and the user device acting as a sink, generating a displayable IoT control interface for the two or more IoT devices that lists some or all of the received information and includes at least one user input feature by which a user of the user device can indicate a request to modify one or more settings associated with at least one of the two or more IoT devices, sending, to the user device, the displayable IoT control interface within a media stream of the wireless media presentation session, receiving user input feedback over a user input feedback channel in response to a presentation of the displayable IoT control interface on the user device and determining whether to modify one or more settings associated with the at least one IoT device based upon the user input feedback.

Another embodiment is directed to a method of operating a user device that is configured to access two or more Internet of Things (IoT) devices of an IoT network via an IoT controller, including establishing a wireless media presentation session with the IoT controller with the IoT controller acting as a source and the user device acting as a sink, receiving, from the IoT controller within a media stream of the wireless media presentation session, a displayable IoT control interface that lists information received from the two or more IoT devices and includes at least one user input feature by which a user of the user device can indicate a request to modify one or more settings associated with at least one of the two or more IoT devices, displaying the displayable IoT control interface on a display of the user device, receiving user input feedback in response to the displaying and sending the user input feedback to the IoT controller over a user input feedback channel.

Another embodiment is directed to an Internet of Things (IoT) controller configured to permit, to one or more user devices, access to two or more IoT devices of an IoT network, at least one processor coupled to transceiver circuitry and configured to receive information from the two or more IoT devices over an IoT communications interface, establish a wireless media presentation session with a user device with the IoT controller acting as a source and the user device acting as a sink, generate a displayable IoT control interface for the two or more IoT devices that lists some or all of the received information and includes at least one user input feature by which a user of the user device can indicate a request to modify one or more settings associated with at least one of the two or more IoT devices, send, to the user device, the displayable IoT control interface within a media stream of the wireless media presentation session, receive user input feedback over a user input feedback channel in response to a presentation of the displayable IoT control interface on the user device and determine whether to modify one or more settings associated with the at least one IoT device based upon the user input feedback.

Another embodiment is directed to a user device configured to access two or more Internet of Things (IoT) devices of an IoT network via an IoT controller, including at least one processor coupled to transceiver circuitry and configured to establish a wireless media presentation session with the IoT controller with the IoT controller acting as a source and the user device acting as a sink, receive, from the IoT controller within a media stream of the wireless media presentation session, a displayable IoT control interface that lists information received from the two or more IoT devices and includes at least one user input feature by which a user of the user device can indicate a request to modify one or more settings associated with at least one of the two or more IoT devices, display the displayable IoT control interface on a display of the user device, receive user input feedback in response to the display of the displayable IoT control interface and send the user input feedback to the IoT controller over a user input feedback channel.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1A:
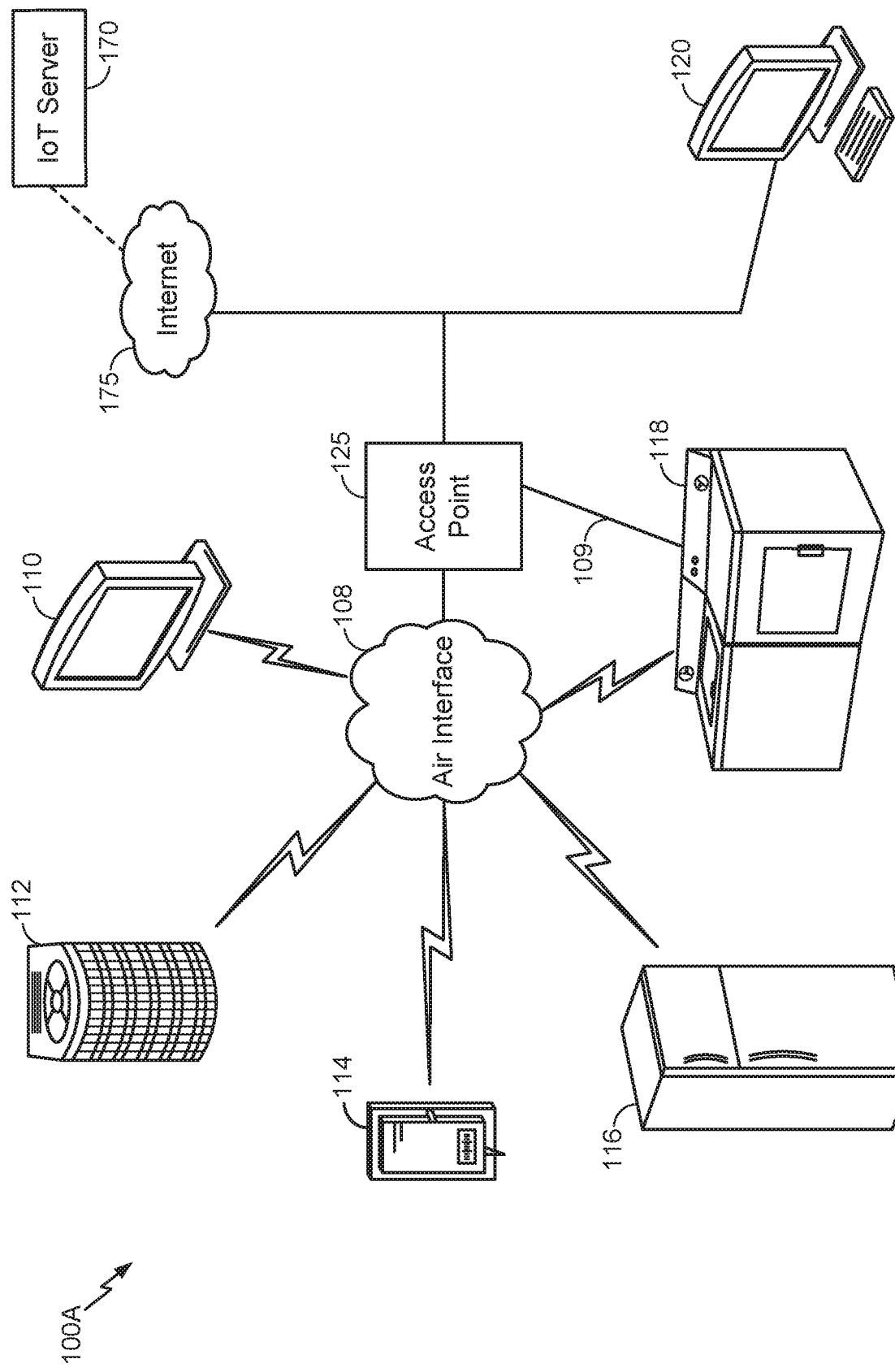
FIGS. 1A-1E illustrate exemplary high-level system architectures of wireless communications systems that may include various Internet of Things (IoT) devices, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with various aspects. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In various embodiments, the IoT server 170 may be optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109 using appropriate device-to-device (D2D) communication technology. Alternatively, or additionally, some or all of the IoT devices 110-120 may be configured with a communication interface independent of the air interface 108 and the direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
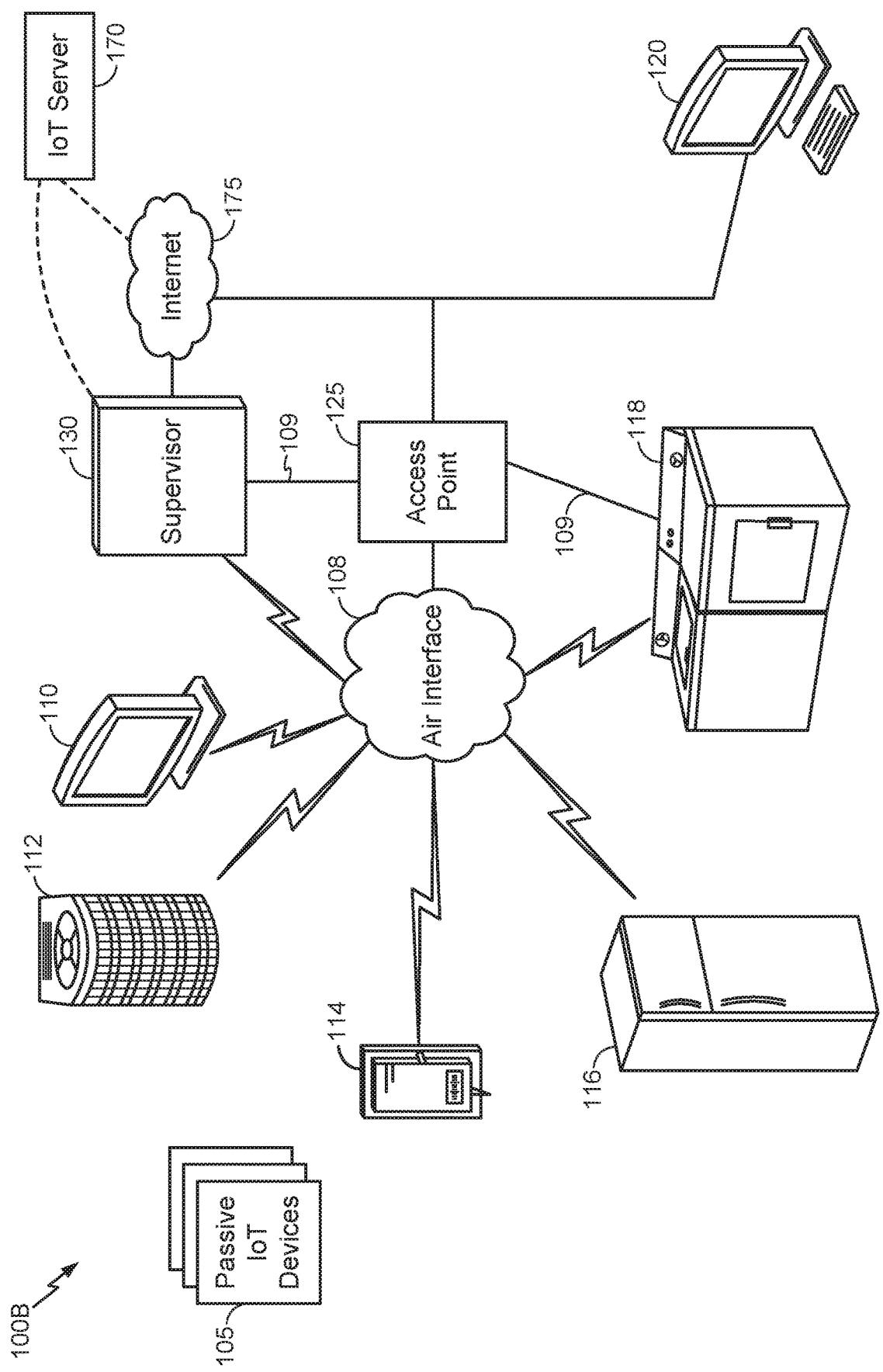

In accordance with various aspects, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In various embodiments, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide an identifier and attributes associated therewith to another device when queried over a short range interface. Active IoT devices may detect, store, communicate, act on, and/or the like, changes in attributes of passive IoT devices.

For example, the one or more passive IoT devices 105 may include a coffee cup passive IoT device 105 and an orange juice container passive IoT device 105 that each have an RFID tag or barcode. A cabinet IoT device (not shown) and the refrigerator IoT device 116 may each have an appropriate scanner or reader that can read the RFID tag or barcode to detect when the coffee cup passive IoT device 105 and/or the orange juice container passive IoT device 105 have been added or removed. In response to the cabinet IoT device detecting the removal of the coffee cup passive IoT device 105 and the refrigerator IoT device 116 detecting the removal of the orange juice container passive IoT device 105, the supervisor device 130 may receive one or more signals that relate to the activities detected at the cabinet IoT device and the refrigerator IoT device 116. The supervisor device 130 may then infer that a user is drinking orange juice from the coffee cup passive IoT device 105 and/or likes to drink orange juice from the coffee cup passive IoT device 105.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate an identity and one or more attributes associated therewith, become part of the wireless communications system 100B, and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
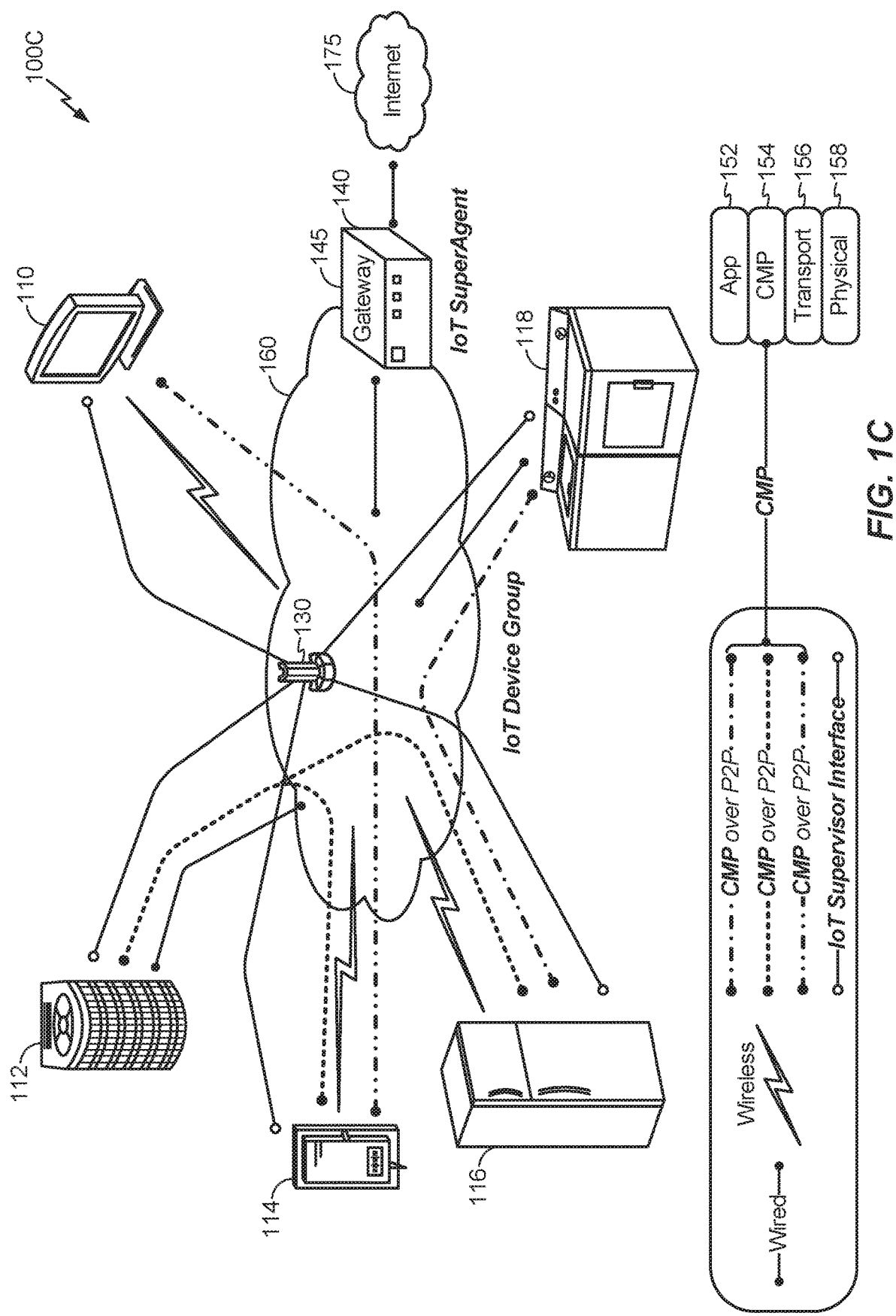

In accordance with various aspects, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The wireless communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT device group 160. The IoT device group 160 may comprise a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, the IoT device can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
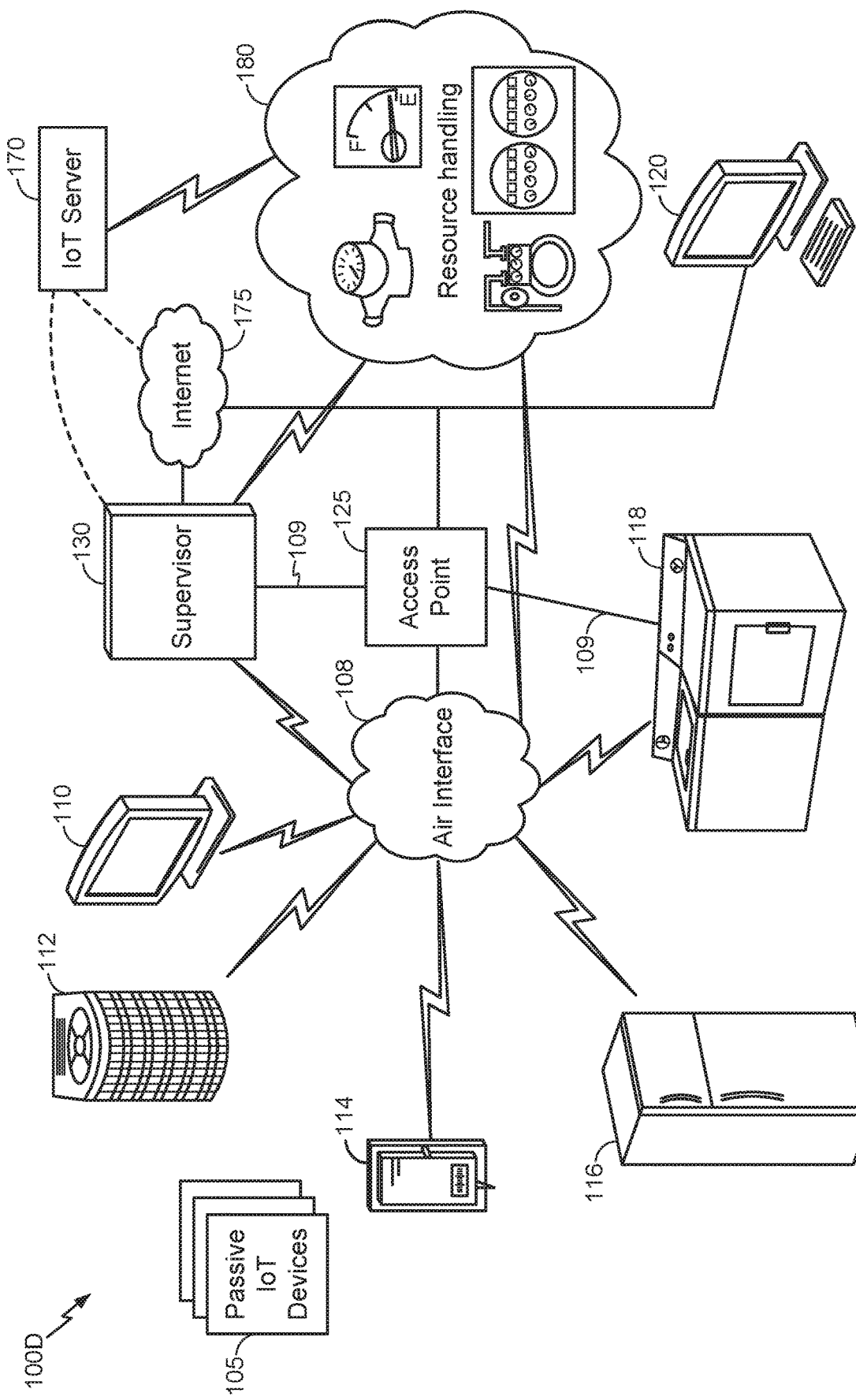

In accordance with various aspects, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-100C shown in FIGS. 1A-1C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-100C illustrated in FIGS. 1A-1C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate the resource, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
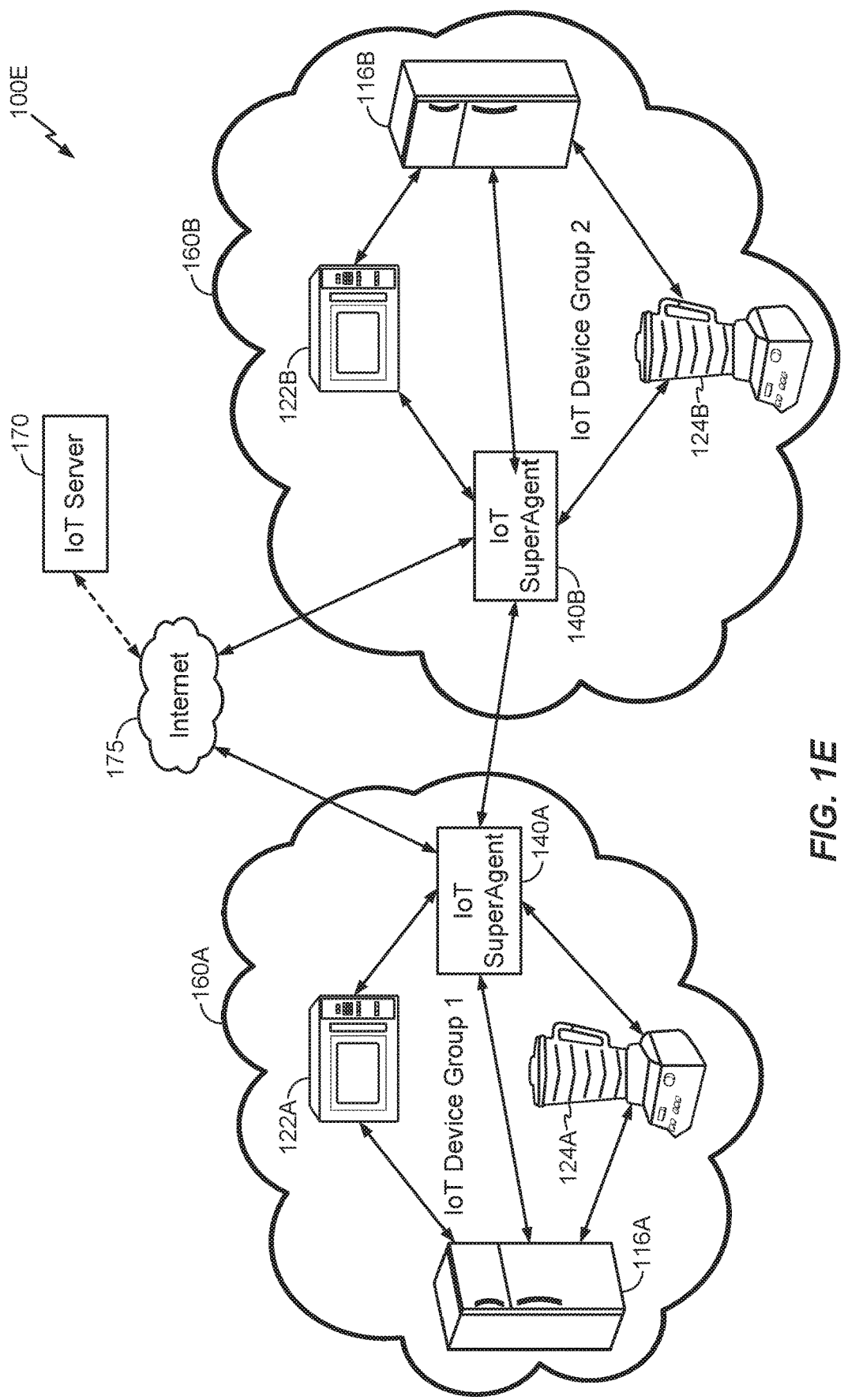

In accordance with various aspects, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-100D shown in FIGS. 1A-1D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-100D illustrated in FIGS. 1A-1D, respectively.

The wireless communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
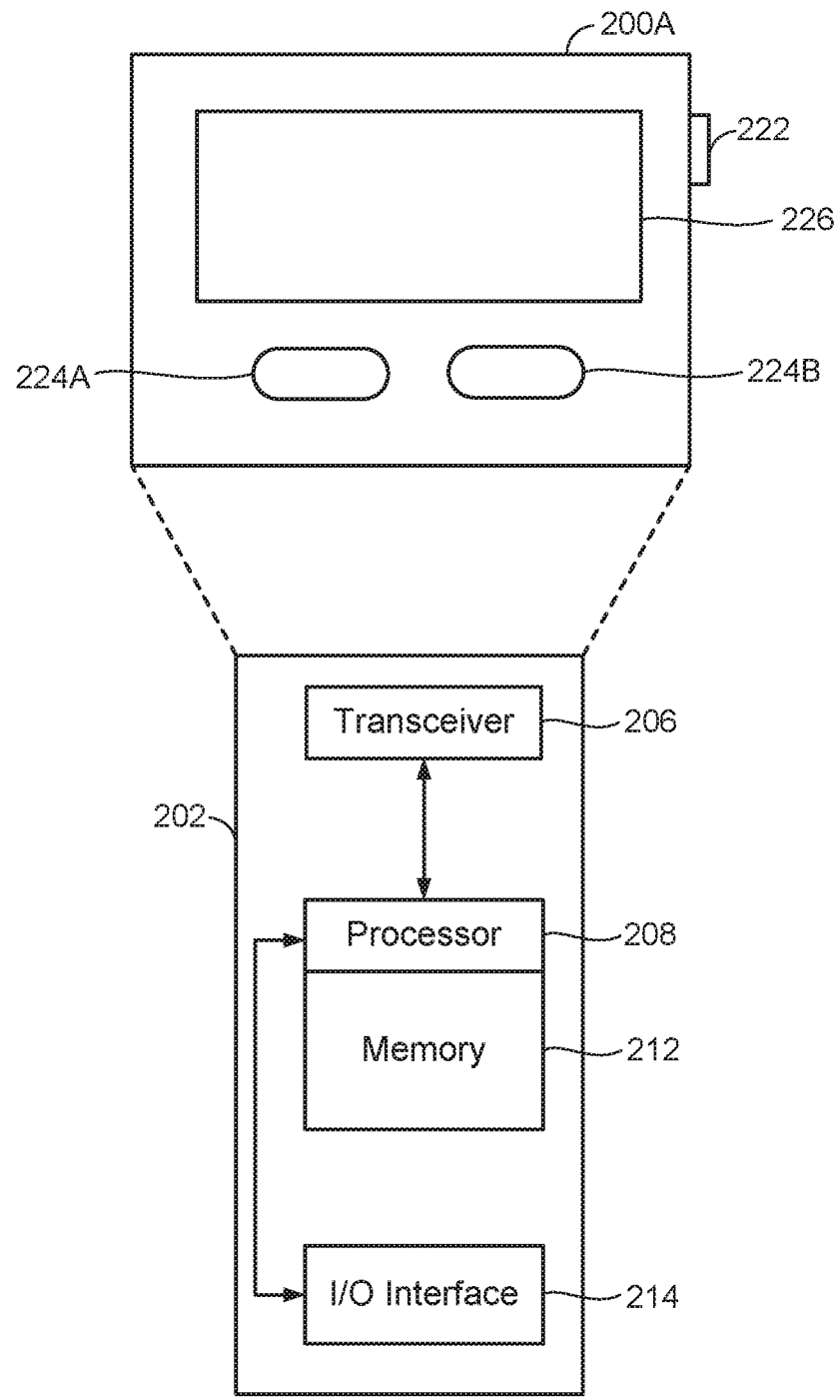
FIG. 2A illustrates an exemplary IoT device and FIG. 2B illustrates an exemplary passive IoT device, according to various aspects.

FIG. 2A illustrates a high-level example of an IoT device 200A in accordance with various aspects. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-1B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-1B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, various aspects can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the IoT device 200A is not limited to the illustrated features or arrangement shown in FIG. 2A.

Figure 2B:
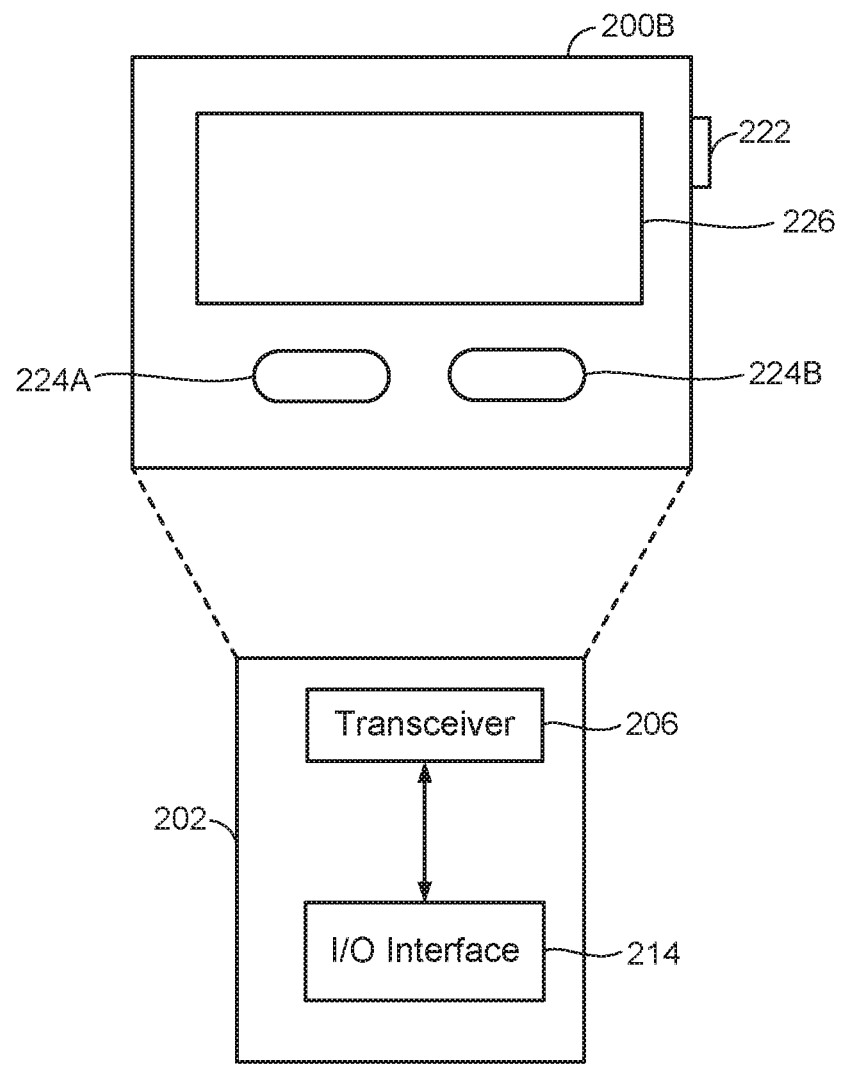

FIG. 2B illustrates a high-level example of a passive IoT device 200B in accordance with various aspects. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in various embodiments, the passive IoT device 200B may only include an I/O interface 214 or other suitable mechanism that allows the passive IoT device 200B to be observed, monitored, controlled, managed, or otherwise known within a controlled IoT network. For example, in various embodiments, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate an identity and one or more attributes associated therewith and be observed, monitored, controlled, or otherwise managed within a controlled IoT network.

Figure 3:
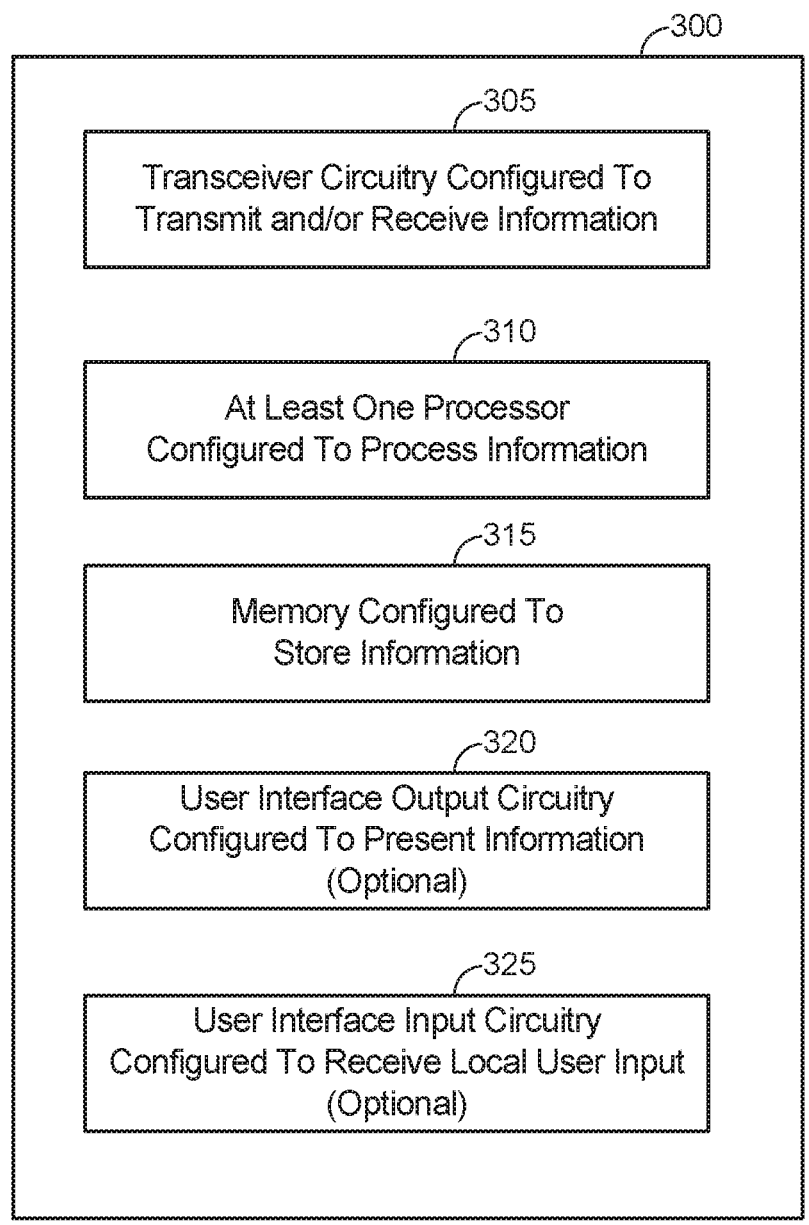
FIG. 3 illustrates a communication device that includes various structural components configured to perform functionality, according to various aspects.

FIG. 3 illustrates a communication device 300 that includes various structural components configured to perform functionality. The communication device 300 can correspond to any of the communication devices described in further detail above, including but not limited to any one or more of the IoT devices or other devices in the wireless communications systems 100A-100E shown in FIGS. 1A-1E, the IoT device 200A shown in FIG. 2A, the passive IoT device 200B shown in FIG. 2B, any components coupled to the Internet 175 (e.g., the IoT server 170), and so on. Accordingly, those skilled in the art will appreciate that the communication device 300 shown in FIG. 3 can correspond to any electronic device configured to communicate with and/or facilitate communication with one or more other entities, such as in the wireless communications systems 100A-100E as shown in FIGS. 1A-1E.

Referring to FIG. 3, the communication device 300 includes transceiver circuitry configured to transmit and/or receive information 305. In an example, if the communication device 300 corresponds to a wireless communications device (e.g., IoT device 200A and/or passive IoT device 200B), the transceiver circuitry configured to transmit and/or receive information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the transceiver circuitry configured to transmit and/or receive information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the transceiver circuitry configured to transmit and/or receive information 305 can correspond to an Ethernet card, in an example, that connects the network-based server to other communication entities via an Ethernet protocol. In a further example, the transceiver circuitry configured to transmit and/or receive information 305 can include sensory or measurement hardware by which the communication device 300 can monitor a local environment associated therewith (e.g., an accelerometer, a temperature sensor, a light sensor, an antenna for monitoring local RF signals, etc.). The transceiver circuitry configured to transmit and/or receive information 305 can also include software that, when executed, permits the associated hardware of the transceiver circuitry configured to transmit and/or receive information 305 to perform the reception and/or transmission function(s) associated therewith. However, the transceiver circuitry configured to transmit and/or receive information 305 does not correspond to software alone, and the transceiver circuitry configured to transmit and/or receive information 305 relies at least in part upon structural hardware to achieve the functionality associated therewith.

Referring to FIG. 3, the communication device 300 further includes at least one processor configured to process information 310. Example implementations of the type of processing that can be performed by the at least one processor configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the at least one processor configured to process information 310 can include a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the at least one processor configured to process information 310 may be any conventional processor, controller, microcontroller, or state machine. The at least one processor configured to process information 310 may also be implemented as a combination of computing devices (e.g., a combination of a DSP and a microprocessor, a plurality of microprocessors, one or more microprocessors in conjunction with a DSP core, or any other such configuration). The at least one processor configured to process information 310 can also include software that, when executed, permits the associated hardware of the at least one processor configured to process information 310 to perform the processing function(s) associated therewith. However, the at least one processor configured to process information 310 does not correspond to software alone, and the at least one processor configured to process information 310 relies at least in part upon structural hardware to achieve the functionality associated therewith.

Referring to FIG. 3, the communication device 300 further includes memory configured to store information 315. In an example, the memory configured to store information 315 can include at least a non-transitory memory and associated hardware (e.g., a memory controller, etc.). For example, the non-transitory memory included in the memory configured to store information 315 can correspond to RAM, flash memory, ROM, erasable programmable ROM (EPROM), EEPROM, registers, hard disk, a removable disk, a CD-ROM, or any other form of storage medium known in the art. The memory configured to store information 315 can also include software that, when executed, permits the associated hardware of the memory configured to store information 315 to perform the storage function(s) associated therewith. However, the memory configured to store information 315 does not correspond to software alone, and the memory configured to store information 315 relies at least in part upon structural hardware to achieve the functionality associated therewith.

Referring to FIG. 3, the communication device 300 further optionally includes user interface output circuitry configured to present information 320. In an example, the user interface output circuitry configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the user interface output circuitry configured to present information 320 can include the display 226. In a further example, the user interface output circuitry configured to present information 320 can be omitted for certain communication devices, such as network communication devices that do not have a local user (e.g., network switches or routers, remote servers, etc.). The user interface output circuitry configured to present information 320 can also include software that, when executed, permits the associated hardware of the user interface output circuitry configured to present information 320 to perform the presentation function(s) associated therewith. However, the user interface output circuitry configured to present information 320 does not correspond to software alone, and the user interface output circuitry configured to present information 320 relies at least in part upon structural hardware to achieve the functionality associated therewith.

Referring to FIG. 3, the communication device 300 further optionally includes user interface input circuitry configured to receive local user input 325. In an example, the user interface input circuitry configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the user interface input circuitry configured to receive local user input 325 can include the buttons 222, 224A, and 224B, the display 226 (if a touchscreen), etc. In a further example, the user interface input circuitry configured to receive local user input 325 can be omitted for certain communication devices, such as network communication devices that do not have a local user (e.g., network switches or routers, remote servers, etc.). The user interface input circuitry configured to receive local user input 325 can also include software that, when executed, permits the associated hardware of the user interface input circuitry configured to receive local user input 325 to perform the input reception function(s) associated therewith. However, the user interface input circuitry configured to receive local user input 325 does not correspond to software alone, and the user interface input circuitry configured to receive local user input 325 relies at least in part upon structural hardware to achieve the functionality associated therewith.

Referring to FIG. 3, while the structural components 305 through 325 are shown as separate or distinct blocks in FIG. 3, those skilled in the will appreciate that the various structural components 305 through 325 may be coupled to one other via an associated communication bus (not shown) and further that the hardware and/or software through which the respective structural components 305 through 325 perform the respective functionality associated therewith can overlap in part. For example, any software used to facilitate the functionality associated with the structural components 305 through 325 can be stored in the non-transitory memory associated with the memory configured to store information 315, such that the configured structural components 305 through 325 each perform the respective functionality associated therewith (i.e., in this case, software execution) based in part upon the operation of the software stored in the memory configured to store information 315. Likewise, hardware that is directly associated with one of the structural components 305 through 325 can be borrowed or used by other structural components 305 through 325 from time to time. For example, the at least one processor configured to process information 310 can format data into an appropriate format before being transmitted via the transceiver circuitry configured to transmit and/or receive information 305, such that the transceiver circuitry configured to transmit and/or receive information 305 performs the functionality associated therewith (i.e., in this case, transmission of data) based in part upon the operation of structural hardware associated with the at least one processor configured to process information 310.

Accordingly, those skilled in the art will appreciate that the various structural components 305 through 325 as shown in FIG. 3 are intended to invoke an aspect that is at least partially implemented with structural hardware, and are not intended to map to software-only implementations that are independent of hardware and/or non-structural (e.g., purely functional) interpretations. Furthermore, those skilled in the art will appreciate other interactions or cooperation between the structural components 305 through 325, which will become clear based on the various aspects and embodiments described more fully below.

Figure 4:
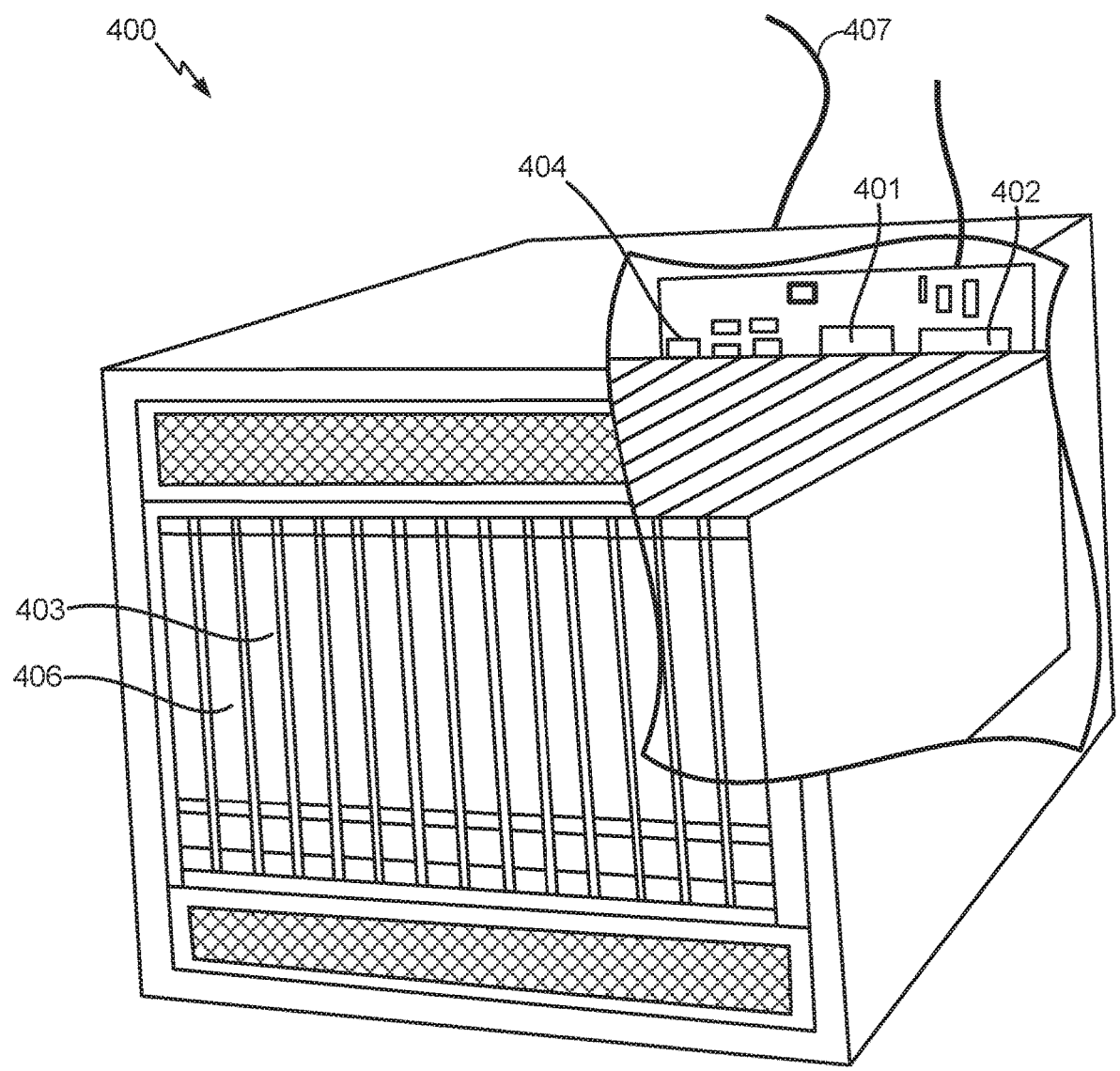
FIG. 4 illustrates an exemplary server, according to various aspects.

The various aspects and embodiments described herein may be implemented on any of a variety of commercially available server devices, including a server 400 as illustrated in FIG. 4. In an example, the server 400 may correspond to one example configuration of the IoT server 170 described above. In FIG. 4, the server 400 includes a processor 401 coupled to volatile memory 402 and a large capacity non-volatile memory 403 (e.g., a hard disk). The server 400 may also include a floppy disk drive, a compact disk (CD) drive, and/or a DVD disk drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, those skilled in the art will appreciate that the server 400 of FIG. 4 illustrates one example implementation of the communication device 300, whereby the transceiver circuitry configured to transmit and/or receive information 305 may correspond to the network access ports 404 used by the server 400 to communicate with the network 407, the at least one processor configured to process information 310 may correspond to the processor 401, and the memory configured to store information 315 may correspond to any combination of the volatile memory 402, the nonvolatile memory 403, and/or the floppy/CD/DVD disk drive 406. The optional user interface output circuitry configured to present information 320 and the optional user interface input circuitry configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

In general, as noted above, IP based technologies and services have become more mature, driving down the cost and increasing availability of IP, which has allowed Internet connectivity to be added to more and more types of everyday electronic objects. As such, the IoT is based on the idea that everyday electronic objects, not just computers and computer networks, can be readable, recognizable, locatable, addressable, and controllable via the Internet. In general, with the development and increasing prevalence of the IoT, numerous proximate heterogeneous IoT devices and other physical objects that have different types and perform different activities (e.g., lights, printers, refrigerators, air conditioners, etc.) may interact with one another in many different ways and be used in many different ways.

Figure 5:
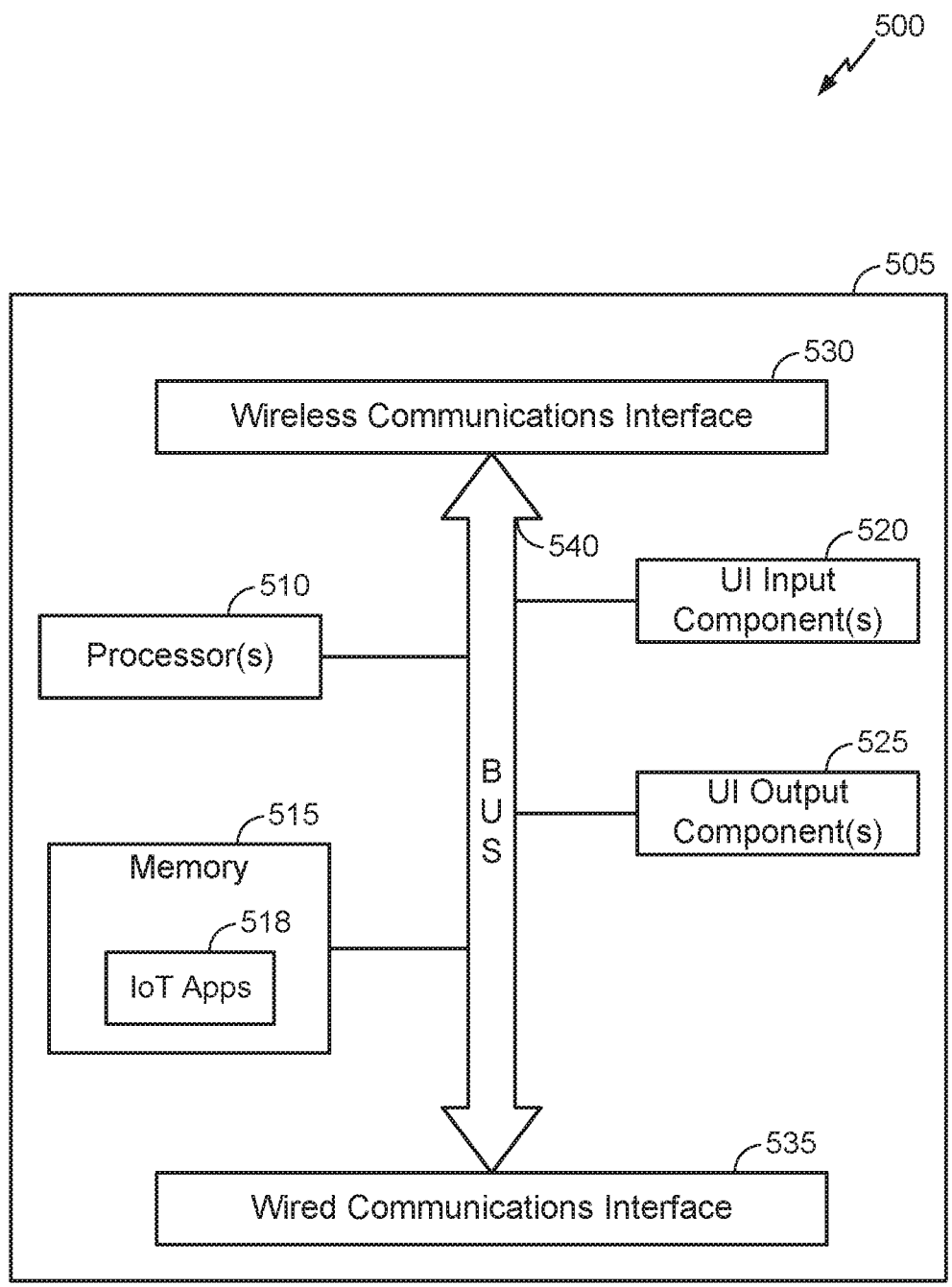
FIG. 5 illustrates an IoT Controller in accordance with an embodiment of the disclosure.

FIG. 5 illustrates an IoT Controller 500 in accordance with an embodiment of the disclosure. In an example, the IoT Controller 500 can correspond to any of a number of different device types (e.g., a Smart Monitor, a wireless access point, a desktop or laptop computer, etc.). A high-level hardware configuration of the IoT Controller 500 that can be used by any of these potential device types is depicted with respect to platform 505.

Referring to FIG. 5, the platform 505 of the IoT Controller 500 includes one or more processors 510 (e.g., one or more application specific integrated circuit (ASICs), one or more digital signal processors (DSPs), etc.) and a memory 515 (e.g., RAM, ROM, EEPROM, flash cards, or any memory common to computer platforms). As will be described below in more detail, the memory 515 includes a plurality of IoT applications 518 that are each configured for execution on the IoT Controller 500. When executed, each of the plurality of IoT applications 518 is configured to interact with and/or display information associated with a particular IoT device (e.g., a dishwasher, a refrigerator, etc.) and/or a particular class of IoT devices (e.g., a group of lightbulbs in a particular room, etc.). As will be described below in more detail, execution of the plurality of IoT applications 518 may involve rendering of a displayable IoT control interface that can be displayed via an optional display screen at the IoT Controller 500 and/or streamed to one or more target devices for presentation thereon via one or more wireless media sessions (e.g., Miracast sessions, etc.) with the IoT Controller 500 acting as a Source for the one or more wireless media sessions and the one or more target devices acting as Sink(s) for the one or more wireless media sessions. The platform 505 also includes one or more UI input components 520 (e.g., a power button, a volume button, a keyboard, a touchscreen, a microphone, etc.) and optionally includes one or more UI output components 525 (e.g., speakers, a display screen, etc.).

Referring to FIG. 5, the platform 505 includes a wireless communications interface 530 and (optionally) a wired communications interface 535. In an example embodiment, the wireless communications interface 530 includes one or more wireless transceivers for communication in accordance with a local wireless communications protocol (e.g., WLAN or WiFi, WiFi Direct, Bluetooth, etc.). The wireless communications interface 530 also optionally includes one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). In an example embodiment, the optional wired communications interface 535 can be used to support wired local media connections (e.g., USB, HDMI, DVI, VGA, DisplayPort, etc.) and/or data connections to a wired access network (e.g., via an Ethernet cable or another type of cable that can function as a bridge to the wired access network such as HDMI v1.4 or higher, etc.). The various components 510-535 of the platform 505 can communicate with each other via a bus 540. Referring to FIG. 5, in at least one embodiment, the IoT Controller 500 may correspond to a Smart Monitor (e.g., the Dell 23 Wireless Monitor or the Dell 24 Wireless Monitor) that supports a Wireless Docking function with respect to multiple Sources concurrently. The features of the IoT Controller 500 in FIG. 5 are to be considered merely illustrative and the disclosure is not limited to the illustrated features or arrangement.

Referring to FIG. 5, the IoT Controller 500 may correspond to an IoT SuperAgent (or IoT Gateway), as described above with respect to the IoT SuperAgent 140 for example. Alternatively, the IoT Controller 500 may not have an independent connection to the Internet 175 and thereby may not function as an IoT Gateway. The IoT Controller 500 also corresponds to one particular example implementation of the communication device 300 of FIG. 3.

Figure 6:
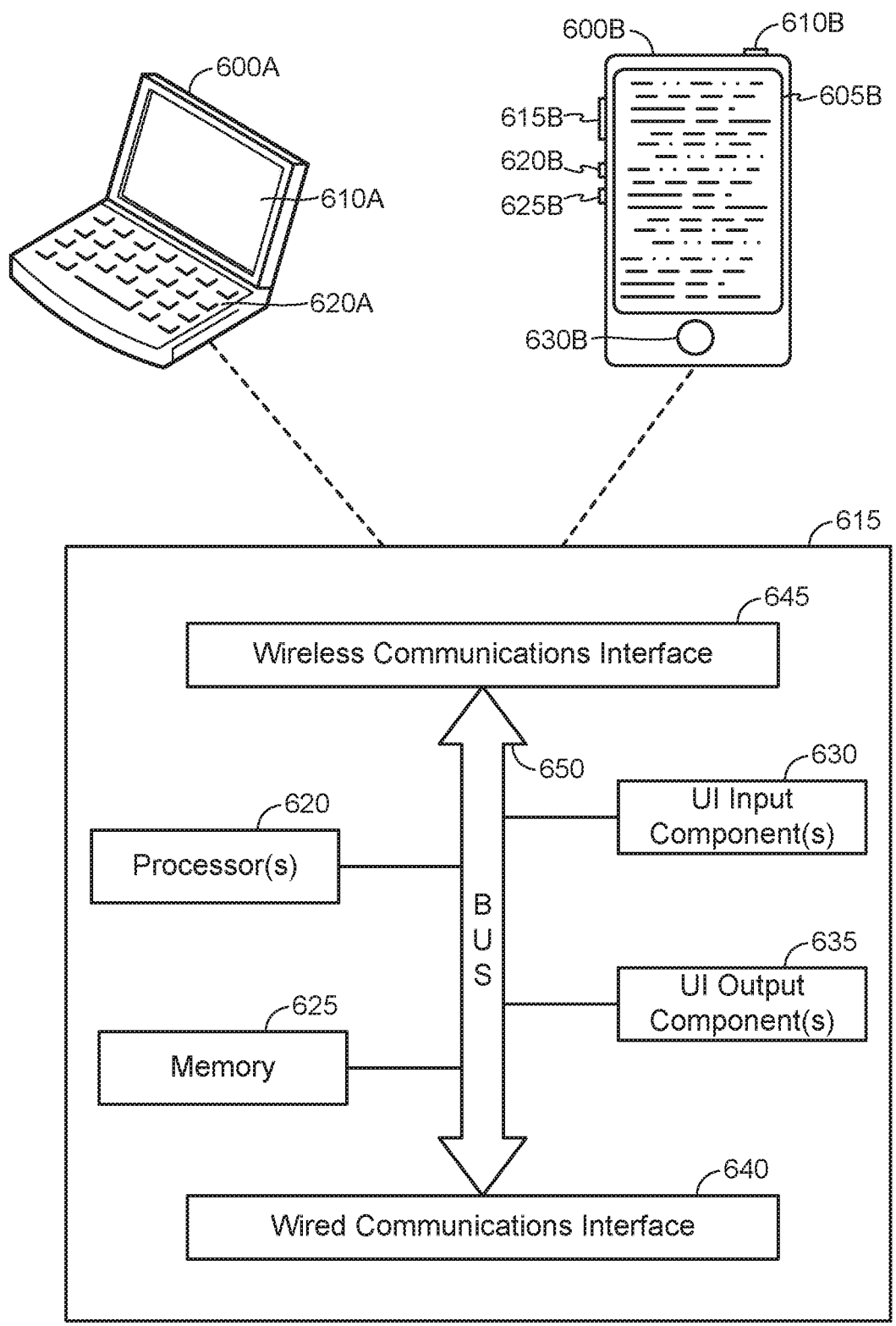
FIG. 6 illustrates user devices in accordance with an embodiment of the disclosure.

FIG. 6 illustrates user devices 600A and 600B in accordance with an embodiment of the disclosure. Referring to FIG. 6, user device 600A is illustrated as a laptop computer and user device 600B is illustrated as a touchscreen device (e.g., a smart phone, a tablet computer, etc.). As shown in FIG. 6, an external casing of user device 600A is configured with display 610A and a keyboard 620A among other components, as is known in the art. Also, an external casing of user device 600B is configured with a touchscreen display 605B, peripheral buttons 610B, 615B, 620B and 625B (e.g., a power control button, a volume or vibrate control button, an airplane mode toggle button, etc.), and at least one front-panel button 630B (e.g., a Home button, etc.), among other components, as is known in the art. While not shown explicitly as part of user devices 600A or 600B, user devices 600A and 600B can include one or more external antennas and/or one or more integrated antennas, including but not limited to WiFi antennas, cellular antennas, satellite position system (SPS) antennas (e.g., global positioning system (GPS) antennas), and so on. While not shown explicitly in FIG. 6, other types of user devices may include desktop computers, smart watches and/or any other type of device that is capable of receiving media to from a Source (e.g., such as IoT Controller 500 of FIG. 5) for presentation.

While components of user devices such as user devices 600A and 600B can be embodied with different hardware configurations, a basic high-level user device configuration for hardware components is shown as platform 615 in FIG. 6. The platform 615 includes one or more processors 620 (e.g., one or more application specific integrated circuit (ASICs), one or more digital signal processors (DSPs), etc.) and a memory 625 (e.g., RAM, ROM, EEPROM, flash cards, or any memory common to computer platforms). The platform 615 also includes one or more UI input components 630 (e.g., supporting the keyboard 620A, the buttons 610B-625B, etc.) and/or one or more UI output components 635 (e.g., supporting the display screens 610A and/or 605B, etc.).

The platform 615 further includes a wired communications interface 640 and a wireless communications interface 645. In an example embodiment, the wired communications interface 640 can be used to provide power, a data connection and/or to connect to a wired access network (e.g., via an Ethernet cable, etc.). The wireless communications interface 645 includes one or more wireless transceivers for communication in accordance with a local wireless communications protocol (e.g., WLAN or WiFi, WiFi Direct, Bluetooth, etc.). The wireless communications interface 645 also optionally includes one or more wireless transceivers for communication with a cellular RAN (e.g., via CDMA, W-CDMA, time division multiple access (TDMA), frequency division multiple access (FDMA), Orthogonal Frequency Division Multiplexing (OFDM), GSM, or other protocols that may be used in a wireless communications network or a data communications network). The various components 620-645 of the platform 615 can communicate with each other via a bus 650. The features of the user devices 600A and 600B in FIG. 6 are to be considered merely illustrative and the disclosure is not limited to the illustrated features or arrangement. Further, the user devices 600A and 600B as well as platform 615 correspond to example implementations of the communication device 300 of FIG. 3.

Figure 7:
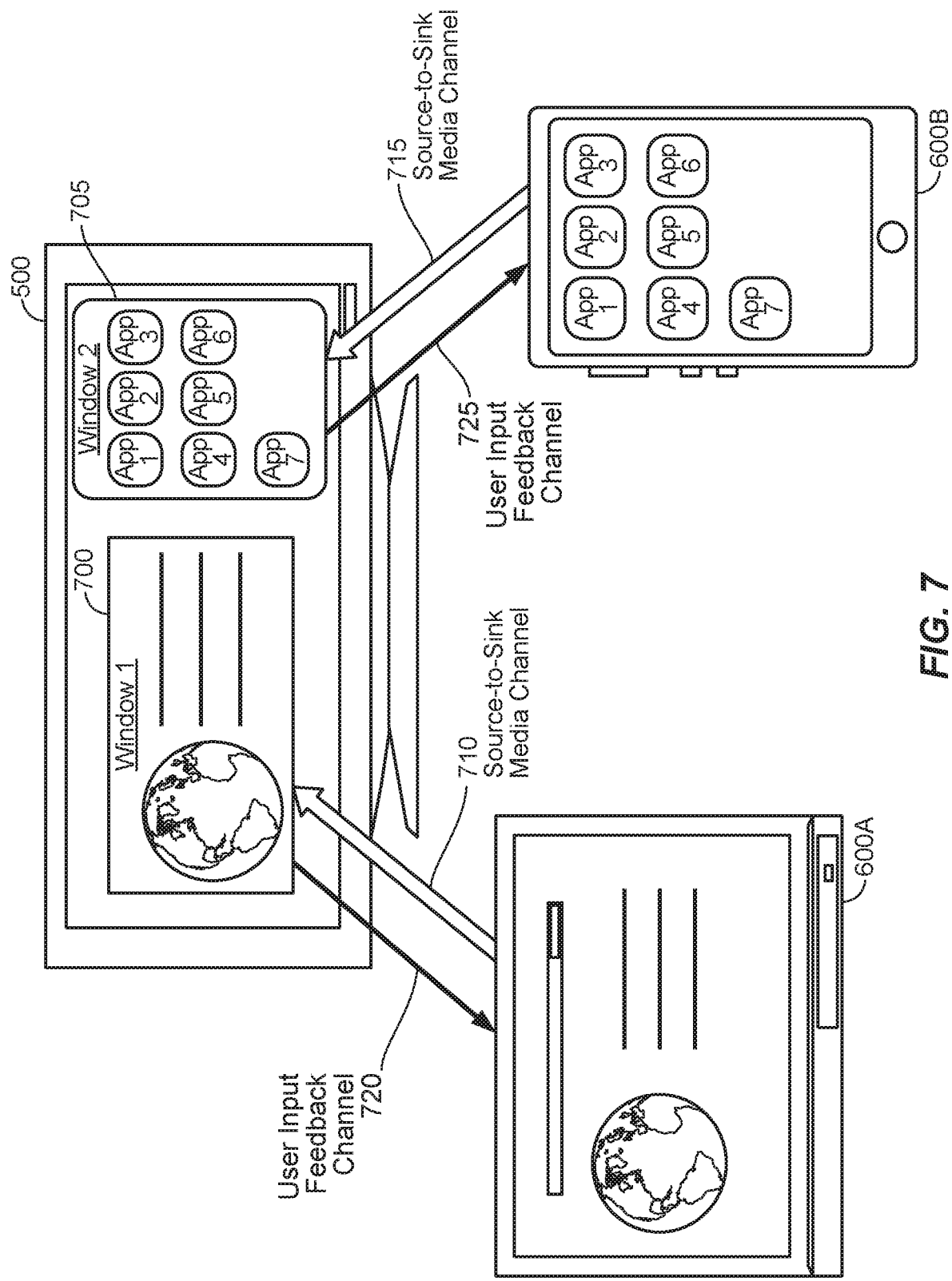
FIG. 7 illustrates an example of two concurrent wireless media presentation sessions being implemented between the IoT Controller of FIG. 5 and the user devices of FIG. 6 in accordance with an embodiment of the disclosure.

FIG. 7 illustrates an example of two concurrent wireless media presentation sessions being implemented between the IoT Controller 500 of FIG. 5 and user devices 600A and 600B of FIG. 6 in accordance with an embodiment of the disclosure. Various protocols exist for streaming media (e.g., video, audio, etc.) over local wireless networks (e.g., infrastructure WLANs, etc.). One example is Version R1 of Miracast (hereinafter, "Miracast-R1"), which defines a protocol by which a source device (hereinafter "Source", such as a UE such as a phone, laptop, etc.) can connect to an external display device (referred to as a sink device or "Sink") using a WiFi Direct connection. Miracast-R2 is a newer version of Miracast that is currently under development and which is considering support for multiple Sources connected to a single Sink (many-to-one) and a single Source connected to multiple Sinks (one-to-many).

Referring to FIG. 7, user devices 600A and 600B are each Sources with respect to their wireless media presentation sessions with IoT Controller 500. The embodiment of FIG. 7 illustrates a specific example where the media being rendered locally on the user devices 600A and 600B is being cloned (or screen-mirrored) within respective windows 700 and 705 on the IoT Controller 500. For example, the Source 600A is displaying a web browser, and a first media stream transmitted to the IoT Controller 500 causes the web browser to be displayed within the window 700 of the IoT Controller 500. Also, the user device 600B is displaying a mobile application listing (e.g., App 1, App 2, etc.), and a second media stream transmitted to the IoT Controller 500 causes the application listing to be displayed within the window 705 of the IoT Controller 500. As shown in FIG. 7, each user device has a Source-to-Sink media stream channel 710 and 715 and a Sink-to-Source user input feedback channel 720 and 725. As will be appreciated, screen-cloning is only one type of possible media presentation session, and other embodiments can be directed to other types of media presentation sessions.

Figure 8:
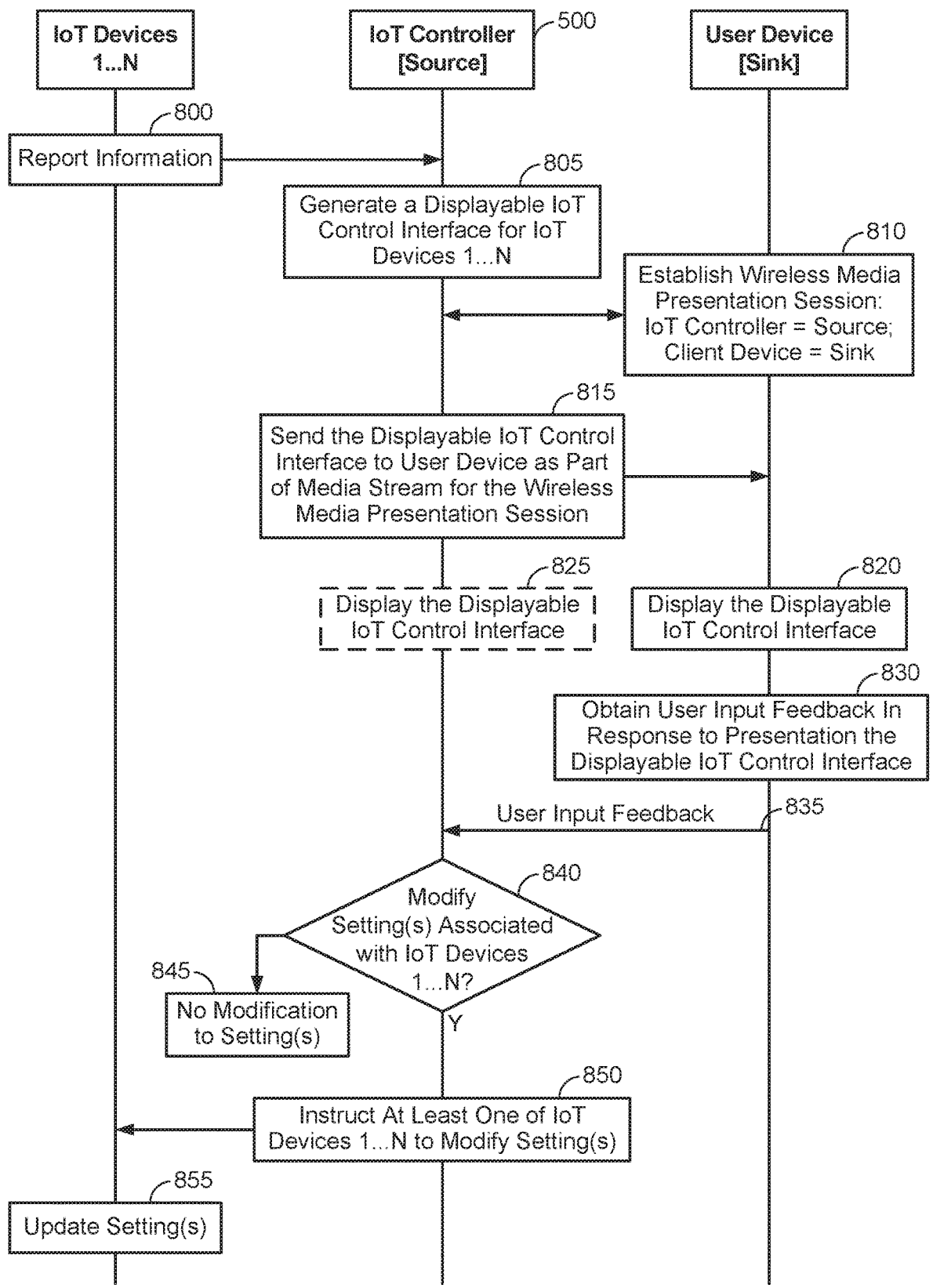
FIG. 8 illustrates a process of extending a displayable IoT control interface from the IoT Controller of FIG. 5 to a target user device in accordance with an embodiment of the disclosure.

FIG. 8 illustrates a process of extending a displayable IoT control interface from the IoT Controller 500 to a target user device in accordance with an embodiment of the disclosure. In contrast to the scenario depicted in FIG. 7, the process of FIG. 8 implements a wireless media presentation session whereby the IoT Controller 500 acts as a Source while the user device acts as a Sink.

Referring to FIG. 8, IoT devices 1 . . . N (e.g., whereby N is greater than or equal to a threshold such as 1, 2, etc.) transmit information to the IoT Controller 500, at block 800. The information at block 800 can be transmitted in a time-based (e.g., every 5 minutes, etc.) or event-based manner (e.g., in response to a sensor measurement at a respective IoT devices, such as when a problem is experienced, temperature rises above or below a threshold, etc.). For example, an IoT refrigerator may report its current temperature settings at block 800 (e.g., freezer temperature as well as main compartment), whether a new water filter is needed, whether the refrigerator or freezer door is open, and so on. In another example, an IoT dishwasher may report a current wash-mode setting (e.g., heavy duty wash, light wash, heavy duty was with bottle rinse, etc.), whether the dishwasher is engaged in an active wash cycle, how much time is left on the active wash cycle, and so on. Accordingly, the information reported at block 800 can include any type of measurement or statistic that is monitored by the respective IoT device. The information is reported to the IoT Controller 500 over any relevant IoT communications interface (e.g., WiFi, Bluetooth, etc.). The information reported at block 800 can further be facilitated by the IoT applications within the memory 515 of the IoT Controller 500. In an example, for an IoT refrigerator, the information at block 800 can be transmitted to a corresponding IoT application at the IoT Controller 500 configured to interface with the IoT refrigerator, and so on. The IoT devices 1 . . . N may include IoT devices that perform different primary functions (e.g., the primary function of a refrigerator is to keep food cold, while the primary function of a smoke detect is to detect smoke, etc.), and IoT devices with different primary functions can be characterized as corresponding to different types of appliances or sensors.

Referring to FIG. 8, at block 805, the IoT Controller 500 generates a displayable IoT control interface for IoT devices 1 . . . N that lists some or all of the information received from IoT devices 1 . . . N at block 800. In an example, IoT devices 1 . . . N may correspond to a subset of the IoT devices with which the IoT Controller 500 has current active windows on an associated display screen. Expanding on this example, each IoT application 518 which is associated with one or more of IoT devices 1 . . . N may be represented on the display screen of the IoT Controller 500 with an associated panel (or widget) through which a user of the IoT Controller 500 can view IoT device settings and (optionally) make IoT settings adjustments (e.g., modifying a refrigerator temperature, pausing a wash cycle of a dishwasher or washing machine, toggling a light on/off or modifying a dim setting, etc.).

Still referring to block 805 of FIG. 8, the displayable IoT control interface further includes one or more user input features by which a user can indicate a request to modify one or more settings associated with at least one of IoT devices 1 . . . N. For example, the user input features can include one or more virtual buttons (e.g., a "+" button to prompt a user to increase a setting, a "−" button to prompt a user to decrease a setting, a "Stop" button to prompt a user to stop an IoT action, etc.), a text entry window, a pull-down menu with different options and so on. As will be described in more detail below, the one or more user input features implemented in the displayable IoT control interface do not actually guarantee that user input received via the one or more user input features will be acted upon. In at least one embodiment, certain settings adjustments may only be made by users with sufficient privileges, and users with lower privileges will be restricted in terms of a degree to which settings adjustments are permitted and/or whether settings adjustments are permitted at all, either for particular IoT devices ore all of IoT devices 1 . . . N.

The displayable IoT control interface may or may not actually be displayed on the IoT Controller 500 itself. For example, if the IoT Controller 500 does not have a display screen and/or the display screen is off, the displayable IoT control interface may be rendered for presentation without actually being presented at the IoT Controller 500. Alternatively, the displayable IoT control interface may be displayed on the IoT Controller 500 and then screen-mirrored on at least one user device as will be described below in more detail.

Referring to FIG. 8, at block 810, a wireless media presentation session is established between the IoT Controller 500 and a user device (e.g., user device 600A, user device 600B, etc.). The wireless media presentation session may be local (e.g., conducted via a direct or P2P connection such a WiFi Direct, mediated by a common WLAN AP, etc.) or remote (e.g., conducted over a cellular broadband connection such as 4G or LTE). In the wireless media presentation session established at block 810, the IoT Controller 500 is the Source and the user device itself is the Sink.

It is common for user devices that initiate wireless media presentation sessions to 'push' media (e.g., video, audio, etc.) to an external media output device (e.g., TV, speakers, etc.) for playback thereon. By contrast, in at least one example implementation of block 810, the wireless media presentation session may be initiated by the user device so that the user device can 'pull' media from the IoT controller 500. In at least one embodiment, the user device being assigned the role of Sink for the wireless media presentation session at block 810 can be based on a device classification of an external device with which the wireless media presentation session is being established. In the case of block 810, the user device may establish the IoT controller 500 as the Source and the user device as the Sink based on an IoT control classification of the IoT controller 500. In a further example, the user device may go on to establish other wireless media presentation sessions with other external devices with different device classifications (e.g., TV, speakers, etc.) where the user device is the Source (not the Sink). Also, other device classifications (e.g., storage drives that host media for playback elsewhere, external devices that do not have media playback capability such as a display screen, etc.) besides the above-noted IoT control classification may trigger selective setup of a wireless media presentation session with the user device being assigned the role of Sink.

At block 815, IoT Controller 500 sends the displayable IoT control interface to the user device as part of a media stream for the wireless media presentation session. At block 820, the user device displays the displayable IoT control interface on a respective display screen. At block 825, the IoT Controller 500 also optionally displays the displayable IoT control interface on its optional display screen. As noted above, block 825 is optional for various reasons (e.g., IoT Controller 500 may not have a display screen, the display screen may be off, etc.). If block 825 is performed, the display of the displayable IoT control interface at block 820 can be referred to as a form of screen-mirroring, although the screen-mirroring need not be exact (e.g., aspect ratios, resolutions, color-schemes, etc. may differ as a function of the wireless media presentation session).

The wireless media presentation session established at block 810 further supports a Sink-to-Source user input feedback channel by which user inputs detected at the user device can be relayed back to the IoT Controller 500. For example, in Miracast, the Sink-to-Source user input feedback channel is referred to as the User Input Back Channel (UIBC). The UIBC permits user input (e.g., mouse clicks, presses on a touch screen, cursor or pointer movement, keyboard entries, button pushes on a phone, speech commands detected via a microphone, etc.) that is detected at the Sink to be relayed back to the corresponding Source that provides the media being displayed where the user input is detected.

Referring to FIG. 8, at block 830, the user device obtains user input feedback (e.g., mouse clicks, presses on a touch screen, cursor or pointer movement, keyboard entries, button pushes on a phone, speech commands detected via a microphone, etc.) in response to presentation of the displayable IoT control interface. At block 835, the user input feedback is reported back to the IoT Controller 500 via the user input feedback channel. Accordingly, the user input feedback is not actually interpreted or mapped to a particular IoT action at the user device itself. Rather, the user device merely acts as the gather of relevant user input feedback which can be leveraged at the IoT Controller 500 after the user input feedback is reported at block 830.

Referring to FIG. 8, at block 840, the IoT Controller 500 determines whether to modify setting(s) associated with one or more IoT devices 1 . . . N based on the user input feedback received at block 835. For example, if the user input feedback is mapped to a user input feature of the displayable IoT control interface (e.g., a mouse left-click is detected at a screen-location that corresponds to a "+" button associated with a thermostat setting, indicating that the user wants to increase the thermostat setting by one degree, etc.), then the IoT Controller 500 determines to modify setting(s) associated with that particular user input feature. In a further example, before authorizing the modification to the IoT setting(s), the IoT Controller 500 may first confirm that the user device has sufficient privileges to modify the implicated IoT setting(s). For example, different users (or user devices) can be associated with different privilege levels (or permissions), such as a parent or administrative user being able to change any IoT device setting (e.g., modifying thermostat temperatures, turning the oven on/off, etc.) while a child or subordinate user has more limited privileges (e.g., a child can change the settings of lights and a fan in his/her room or turn on the television, while not being able to modify more critical home features such as HVAC settings, etc.).

If the IoT Controller 800 determines not to modify any setting(s) associated with any of IoT devices 1 . . . N at block 840, then no setting modification is made, block 845. Otherwise, if the IoT Controller 800 determines to modify setting(s) associated with one or more of the IoT devices 1 . . . N at block 840, then the IoT Controller 500 transmits one or more instructions over the IoT communications interface to request the one or more IoT devices modify their respective setting(s) at block 850. The one or more IoT devices then update their respective setting(s) at block 855. While the process of FIG. 8 is described with respect to a single user device, it will be appreciated that multiple concurrent wireless media presentation sessions can be established with the IoT Controller 500 acting as the Source, and that different users (or user devices) may be provided with the displayable IoT control interface while having different associated privileges (e.g., a parent and child both connect their respective user devices to the IoT Controller 500, but the child is more limited in terms of the setting modifications he/she can make and/or the types of IoT data that is viewable within the displayable IoT control interface).

Figure 9A:
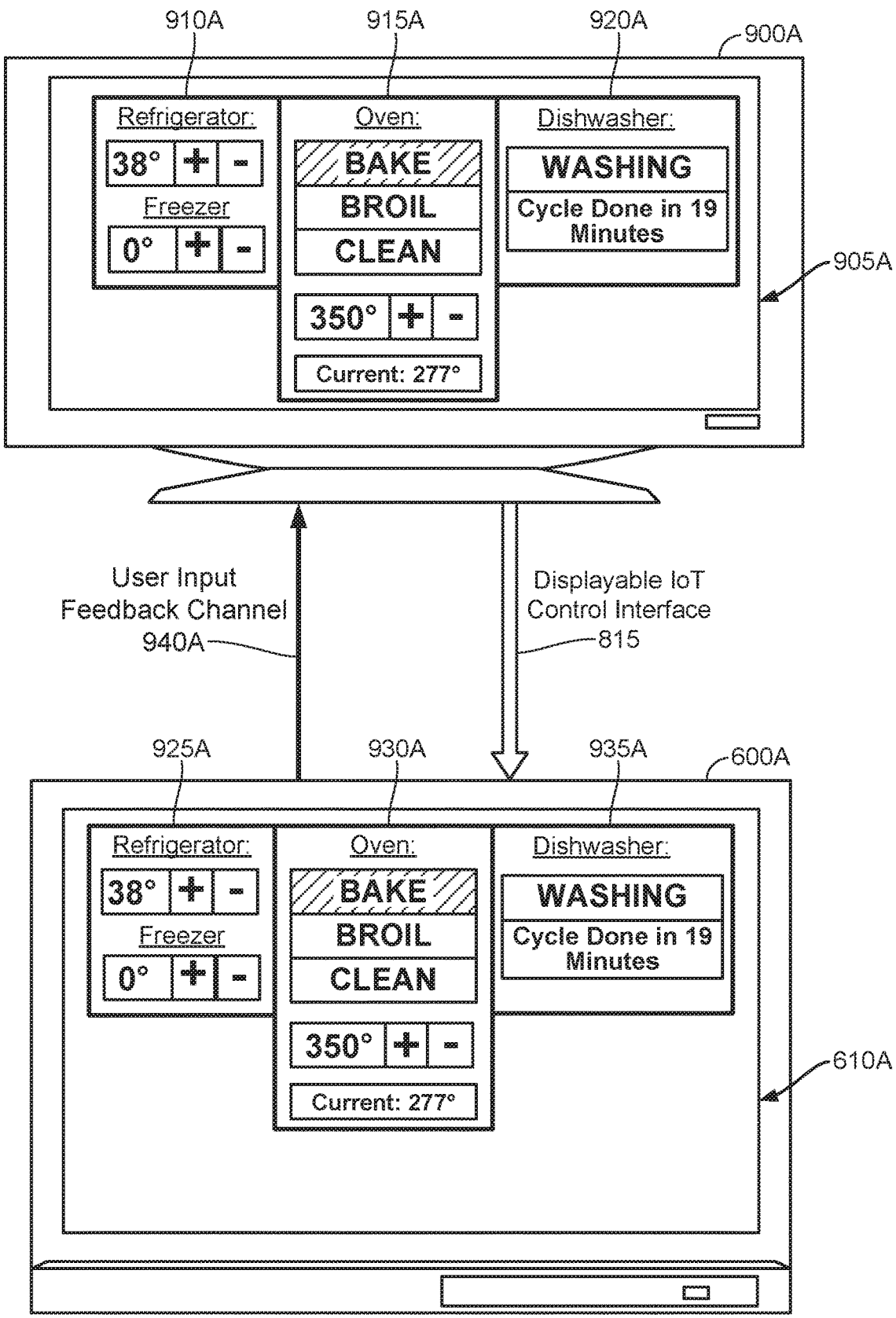
FIGS. 9A-9B illustrate different examples of displayable IoT control interfaces that can be pushed to Sinks (or user devices) during the process of FIG. 8 in accordance with embodiments of the disclosure.
Figure 9B:
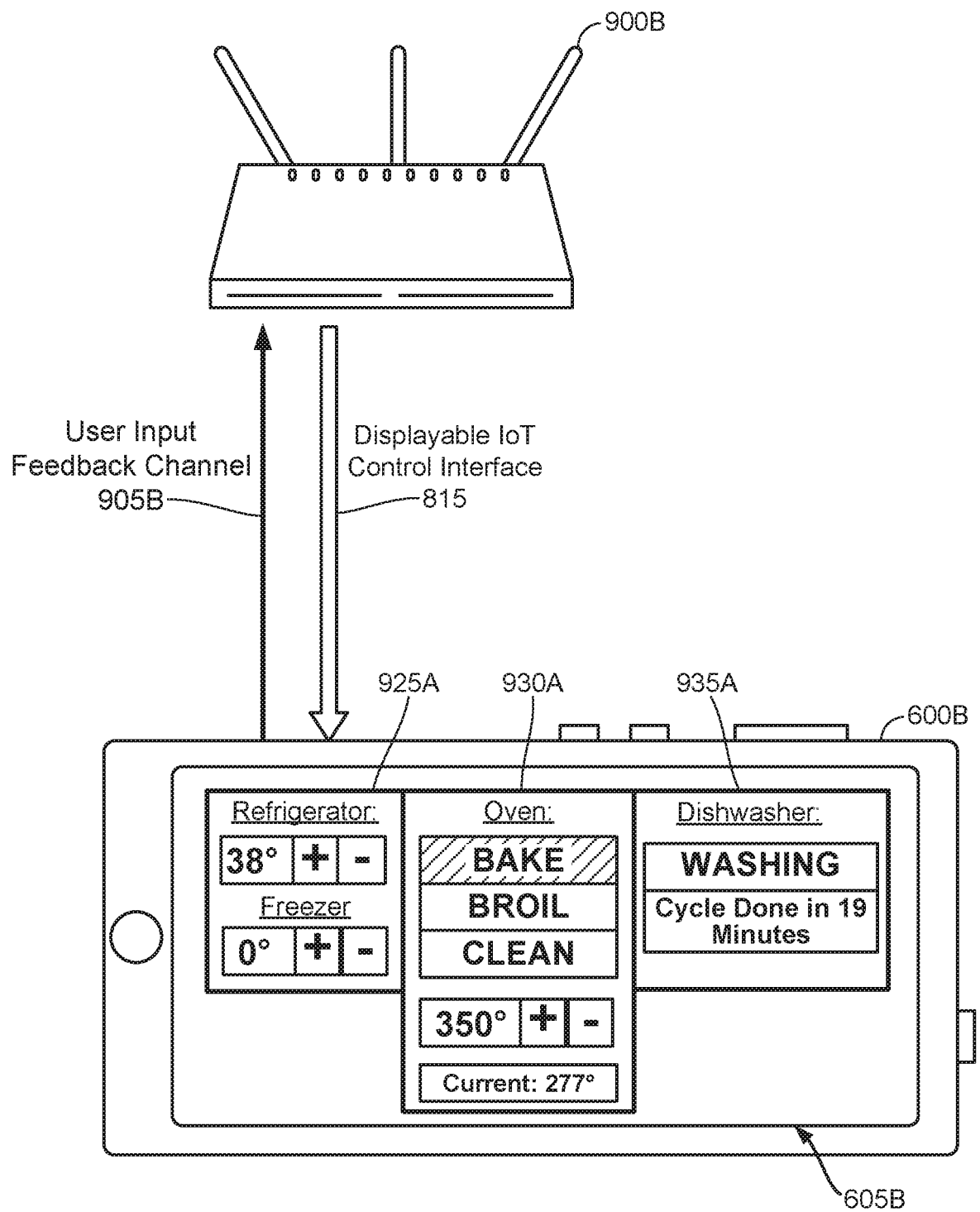

FIGS. 9A-9B illustrate different examples of displayable IoT control interfaces that can be pushed to the Sinks (or user devices) during the process of FIG. 8 in accordance with embodiments of the disclosure.

Referring to FIG. 9A, the IoT Controller 500 is illustrated as monitor 900A (e.g., a Smart Monitor) with a display screen 905A. The display screen 905A includes three panels (or windows) 910A, 915A and 920A. Each of the windows 910A, 915A and 920A may correspond to executions of different IoT applications 518, although it is also possible that a single IoT application 518 could control each of the windows 910A, 915A and 920A.

Window 910A relates to an IoT refrigerator with a refrigerator component set to 38° degrees Fahrenheit (reference to temperature degrees is hereinafter presumed to be made with respect to the Fahrenheit scale) and a freezer compartment set to 0° degrees. Window 910A includes virtual "+" and "−" buttons that permit a user to click-on (or press) to request an increase or decrease to the associated temperature settings.

Window 915A relates to an IoT oven with that is set to BAKE mode (with alternative non-selected options being BROIL and CLEAN), an oven temperature setting of 350° degrees and a current oven temperature of 277° degrees (e.g., indicating that the oven is still pre-heating and has not yet reached the oven temperature setting of 350° degrees). Window 915A includes virtual "+" and "−" buttons that permit a user to click-on (or press) to request an increase or decrease to the oven temperature setting. Also, the virtual buttons BROIL and CLEAN permit a user to click-on (or press) to request a modification to the oven mode (e.g., a user clicks BROIL to select a transition from BAKE to BROIL, etc.).

Window 920A relates to an IoT dishwasher with that is set to WASHING mode along with a notation that the wash cycle will be complete in 19 minutes. There are no user input features depicted in window 920A (e.g., although in other embodiments, the user could have the option to manually shut down the wash cycle, to change the type of wash cycle, etc.).

Referring to FIG. 9A, the content in the display screen 905A of FIG. 9A with the windows 910A-920A corresponds to the displayable IoT control interface that is sent to the target user device at block 815, which in this case is user device 600A. The windows 910A-920A of the displayable IoT control interface are reproduced within the display screen 610A of user device 600A as windows 925A-935A, respectively. A user of user device 600A can thereby view the IoT information conveyed in the 925A-935A of the displayable IoT control interface, and can also provide user input (e.g., clicking on a "+" button, clicking on BROIL to change an oven setting, etc.). Some or all of the user input received at the user device 600A is reported back to the monitor 900A via user input feedback channel 940A, which can then translate the user input received at the user device 600A to its own displayable IoT control interface to determine whether the user input is translatable to a request to change one or more settings of the respective IoT devices.

Referring to FIG. 9B, the IoT Controller 500 is illustrated as a wireless communications device 900B (e.g., a wireless access point or router) that does not include a display screen. In FIG. 9B, the same displayable IoT control interface (including windows 925A-935A) is sent to the target user device (which in this case is user device 600B) even though there is no corresponding display at the wireless communications device 900B. The specific windows 925A-935A are the same as in FIG. 9A and will not be described further for the sake of brevity. Similar to FIG. 9A, a user of user device 600B can view the IoT information conveyed in the 925A-935A of the displayable IoT control interface, and can also provide user input (e.g., clicking on a "+" button, clicking on BROIL to change an oven setting, etc.). Some or all of the user input received at the user device 600B is reported back to the wireless communications device 900B via user input feedback channel 905B, which can then translate the user input received at the user device 600B to determine whether the user input is translatable to a request to change one or more settings of the respective IoT devices.

Figure 10:
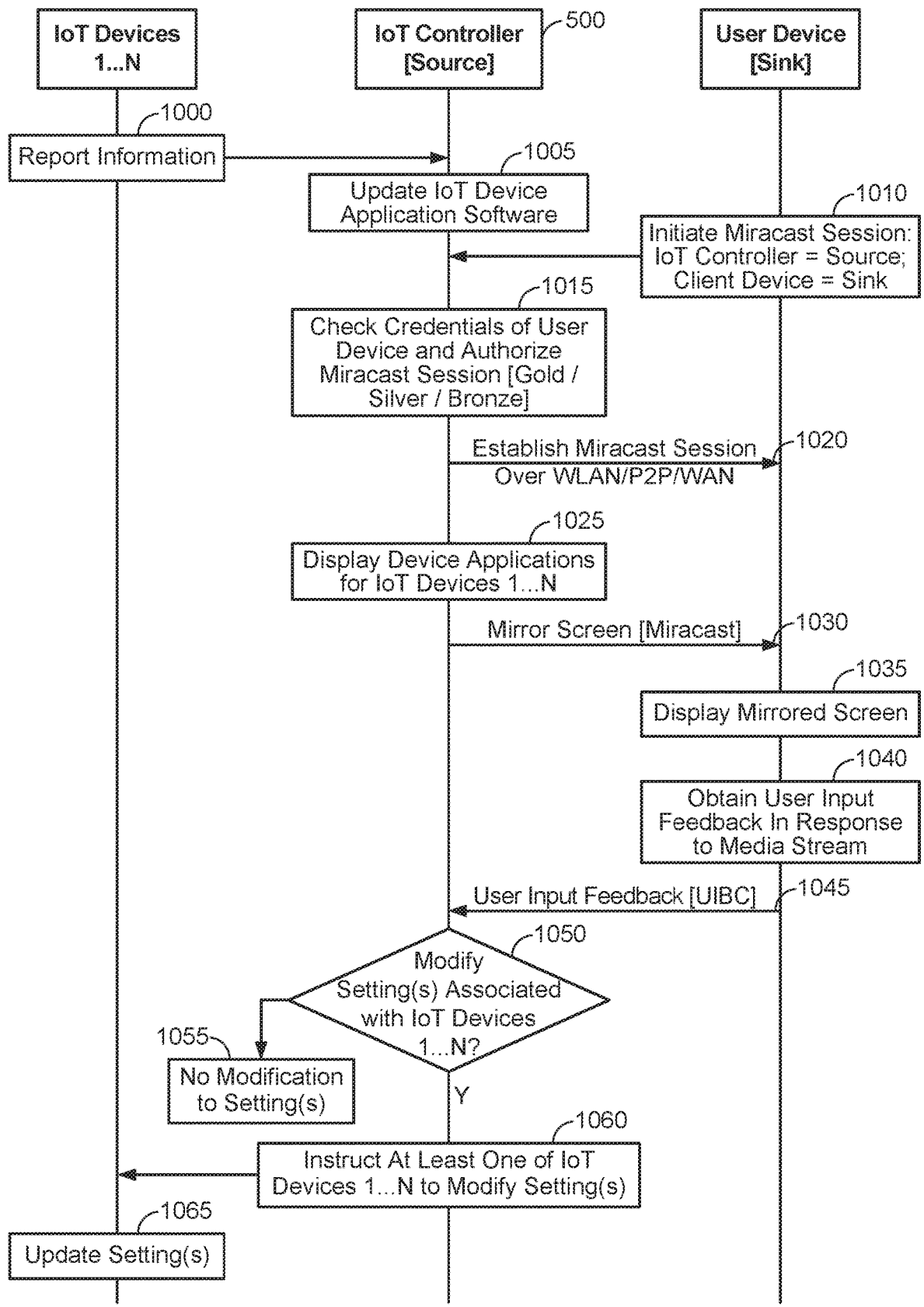
FIG. 10 illustrates a more detailed implementation of the process of FIG. 8 in accordance with an embodiment of the disclosure.

FIG. 10 illustrates a more detailed implementation of the process of FIG. 8 in accordance with an embodiment of the disclosure.

Referring to FIG. 10, at block 1000, IoT devices 1 . . . N (e.g., whereby N is greater than or equal to a threshold such as 1, 2, etc.) report information to the IoT Controller 500 (e.g., similar to block 800 of FIG. 8). The IoT Controller 500 identifies IoT applications 518 that correspond to the IoT devices that reported information in block 1000 and updates the associated IoT device application software, if necessary, at block 1005. For example, if certain IoT applications 518 have windows that are being displayed on a display screen of the IoT Controller 500, these windows may be updated to reflect updated value to certain parameters based on the reported information from block 1000 (e.g., a temperature value may have changed, which caused a change to a display temperature value in a corresponding device application window, etc.). Accordingly, the update at block 1005 may correspond to generation of the displayable IoT control interface at block 805 of FIG. 8.

At block 1010, a user device initiates a Miracast session between the IoT Controller 500 and the user device, with the IoT Controller 500 as the Source and the user device itself as the Sink. The IoT Controller 500 checks credentials associated with the user device and authorizes the Miracast session at block 1010. Once the credentials are verified at block 1015, the IoT Controller 500 establishes the Miracast session over WLAN/P2P/WAN at block 1020. In an example, blocks 1010-1020 correspond to an example implementation of block 810 of FIG. 8. The IoT Controller 500 displays device applications for IoT devices 1 . . . N at block 1025, which corresponds to the constructive display of the displayable IoT control interface at block 825 of FIG. 8. The IoT Controller 500 sends a media stream which mirrors its display via the Miracast session at block 1030, which results in the IoT Controller 500's screen (and hence, the displayable IoT control interface) being mirrored at the user device at block 1035 (e.g., similar to block 820 of FIG. 8).

Referring to FIG. 10, at block 1040, the user device obtains user input feedback in response to the screen-mirroring at block 1035 (e.g., similar to block 830 of FIG. 8). At block 1045, the user input feedback is reported back to the IoT Controller 500 via the UIBC (e.g., similar to block 835 of FIG. 8). At block 1050, the IoT Controller 800 determines whether to modify setting(s) associated with one or more IoT devices 1 . . . N based on the user input feedback received at block 1045 (e.g., similar to block 840 of FIG. 8). If the IoT Controller 500 determines not to modify any setting(s) associated with any of IoT devices 1 . . . N at block 1050, then no setting modification is made, block 1055 (e.g., similar to block 845 of FIG. 8). Otherwise, if the IoT Controller 500 determines to modify setting(s) associated with one or more of the IoT devices 1 . . . N at block 1050, then the IoT Controller 500 transmits one or more instructions over the IoT communications interface to request the one or more IoT devices modify their respective setting(s) at block 1060 (e.g., similar to block 850 of FIG. 8). The one or more IoT devices then update their respective setting(s) at block 1065 (e.g., similar to 855). While the process of FIG. 10 is described with respect to a single user device, it will be appreciated that multiple concurrent wireless media presentation sessions can be established with the IoT Controller 500 acting as the Source, and that different users (or user devices) may be provided with the displayable IoT control interface while having different associated privileges (e.g., a parent and child both connect their respective user devices to the IoT Controller 500, but the child is more limited in terms of the setting modifications he/she can make).

While embodiments have generally been described with respect to video streaming, any of the above-noted embodiments may optionally include an audio component.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. The functions, steps and/or actions of the method claims in accordance with the aspects and embodiments described herein need not be performed in any particular order. Furthermore, although elements may be described above or claimed in the singular, the plural is contemplated unless limitation to the singular is explicitly stated.

What is claimed is:

1. A method of permitting, to one or more user devices, access to two or more Internet of Things (IoT) devices of an IoT network using an IoT controller, comprising:
   receiving information from the two or more IoT devices over an IoT communications interface;
   establishing a wireless media presentation session with a user device with the IoT controller acting as a source and the user device acting as a sink;
   generating a displayable IoT control interface for the two or more IoT devices that lists some or all of the received information and includes at least one user input feature by which a user of the user device can indicate a request to modify one or more settings associated with at least one of the two or more IoT devices;
   sending, to the user device, the displayable IoT control interface embedded as video frame content within a video media stream of the wireless media presentation session;
   receiving user input feedback over a user input feedback channel in response to a presentation of the displayable IoT control interface on the user device; and
   determining whether to modify one or more settings associated with the at least one IoT device based upon the user input feedback.

2. The method of claim 1, wherein the displayable IoT control interface is not displayed on the IoT controller.

3. The method of claim 2, wherein the IoT controller does not include a display screen or the IoT controller includes the display screen but the display screen is turned off.

4. The method of claim 1, wherein the user device acting as the sink for the wireless media presentation session initiates the wireless media presentation session with the IoT controller acting as the source.

5. The method of claim 1,
   wherein the wireless media presentation session is a local wireless media presentation session whereby the IoT controller and the user device are connected via a direct peer-to-peer (P2P) connection or via a local wireless network, or
   wherein the wireless media presentation session is a remote wireless media presentation session whereby the IoT controller and the user device are connected via a cellular connection.

6. The method of claim 1, further comprising:
   displaying the displayable IoT control interface on a display screen of the IoT controller such that the sending sends the displayable IoT control interface to reproduce or screen-mirror, at the user device, the displayable IoT control interface being displayed on the display screen of the IoT controller.

7. The method of claim 1, wherein the determining determines not to modify any settings associated with the at least one IoT device.

8. The method of claim 1, wherein the determining determines to modify at least one setting associated with the at least one IoT device, further comprising:
   sending an instruction to the at least one IoT device to request that the at least one IoT device modify the at least one setting.

9. The method of claim 1, wherein the determining is based in part on whether the user input feedback is mapped by the IoT controller to a given user input feature of the displayable IoT control interface.

10. The method of claim 1, further comprising:
    evaluating a privilege level of the user device and/or a user of the user device,
    wherein the determining is based in part on whether the user device and/or the user of the user device is determined to have a sufficient privilege level for modifying the one or more settings.

11. The method of claim 1,
    wherein the wireless media presentation session is a Miracast session,
    wherein the user input feedback channel is a User Input Back Channel (UIBC), or
    any combination thereof.

12. The method of claim 1,
    wherein the wireless media presentation session includes video only, or
    wherein the wireless media presentation session includes video and audio.

13. The method of claim 1,
    wherein the IoT controller is an IoT gateway of an IoT network that provides the two or more IoT devices with access to the Internet, or
    wherein the IoT controller does not correspond to the IoT gateway.

14. The method of claim 1, wherein the displayable IoT control interface is sent to at least one additional user device as part of at least one additional wireless media presentation session with the IoT controller acting as the source for the at least one additional wireless media presentation session and the at least one additional user device acting as the sink for the at least one additional wireless media presentation session.

15. The method of claim 1, wherein the establishing assigns the IoT controller as the source for the wireless media presentation session and assigns the user device as the sink for the wireless media presentation session based on a device classification of the IoT controller.

16. The method of claim 1,
    wherein a first IoT device among the two or more IoT devices corresponds to a first type of appliance or sensor, and
    wherein a second IoT device among the two or more IoT devices corresponds to a second type of appliance or sensor that is different than the first type of appliance or sensor.

17. A method of operating a user device that is configured to access two or more Internet of Things (IoT) devices of an IoT network via an IoT controller, comprising:
    establishing a wireless media presentation session with the IoT controller with the IoT controller acting as a source and the user device acting as a sink;
    receiving, from the IoT controller embedded as video frame content within a video media stream of the wireless media presentation session, a displayable IoT control interface that lists information received from the two or more IoT devices and includes at least one user input feature by which a user of the user device can indicate a request to modify one or more settings associated with at least one of the two or more IoT devices;
    displaying the displayable IoT control interface on a display of the user device;
    receiving user input feedback in response to the displaying; and
    sending the user input feedback to the IoT controller over a user input feedback channel.

18. The method of claim 17, wherein the establishing assigns the IoT controller as the source for the wireless media presentation session and assigns the user device as the sink for the wireless media presentation session based on a device classification of the IoT controller.

19. The method of claim 18, further comprising:
initiating another wireless media presentation session with an external device with the external device being assigned as the sink and the user device being assigned as the source based on a given device classification of the external device which is different than the device classification of the IoT controller.

20. The method of claim 17, wherein the user device acting as the sink for the wireless media presentation session initiates the wireless media presentation session with the IoT controller acting as the source.

21. The method of claim 17,
wherein the wireless media presentation session is a local wireless media presentation session whereby the IoT controller and the user device are connected via a direct peer-to-peer (P2P) connection or via a local wireless network, or
wherein the wireless media presentation session is a remote wireless media presentation session whereby the IoT controller and the user device are connected via a cellular connection.

22. The method of claim 17, wherein the wireless media presentation session is a screen-mirroring session.

23. The method of claim 17,
wherein the user input feedback indicates a request to modify at least one setting associated with the at least one IoT device, or
wherein the user input feedback does not indicate a request to modify any settings associated with the at least one IoT device.

24. The method of claim 17,
wherein the wireless media presentation session is a Miracast session,
wherein the user input feedback channel is a User Input Back Channel (UIBC), or
any combination thereof.

25. The method of claim 17,
wherein the wireless media presentation session includes video only, or
wherein the wireless media presentation session includes video and audio.

26. The method of claim 17,
wherein the IoT controller is an IoT gateway of an IoT network that provides the two or more IoT devices with access to the Internet, or
wherein the IoT controller does not correspond to the IoT gateway.

27. The method of claim 17,
wherein a first IoT device among the two or more IoT devices corresponds to a first type of appliance or sensor, and
wherein a second IoT device among the two or more IoT devices corresponds to a second type of appliance or sensor that is different than the first type of appliance or sensor.

28. An Internet of Things (IoT) controller configured to permit, to one or more user devices, access to two or more IoT devices of an IoT network, comprising:
at least one processor coupled to transceiver circuitry and configured to:
receive information from the two or more IoT devices over an IoT communications interface;
establish a wireless media presentation session with a user device with the IoT controller acting as a source and the user device acting as a sink;
generate a displayable IoT control interface for the two or more IoT devices that lists some or all of the received information and includes at least one user input feature by which a user of the user device can indicate a request to modify one or more settings associated with at least one of the two or more IoT devices,
send, to the user device, the displayable IoT control interface embedded as video frame content within a video media stream of the wireless media presentation session;
receive user input feedback over a user input feedback channel in response to a presentation of the displayable IoT control interface on the user device; and
determine whether to modify one or more settings associated with the at least one IoT device based upon the user input feedback.

29. The IoT controller of claim 28, wherein the user device acting as the sink for the wireless media presentation session initiates the wireless media presentation session with the IoT controller acting as the source.

30. A user device configured to access two or more Internet of Things (IoT) devices of an IoT network via an IoT controller, comprising:
at least one processor coupled to transceiver circuitry and configured to:
establish a wireless media presentation session with the IoT controller with the IoT controller acting as a source and the user device acting as a sink;
receive, from the IoT controller embedded as video frame content within a video media stream of the wireless media presentation session, a displayable IoT control interface that lists information received from the two or more IoT devices and includes at least one user input feature by which a user of the user device can indicate a request to modify one or more settings associated with at least one of the two or more IoT devices;
display the displayable IoT control interface on a display of the user device;
receive user input feedback in response to the display of the displayable IoT control interface; and
send the user input feedback to the IoT controller over a user input feedback channel.

* * * * *